United States Patent [19]

Koperda

[11] Patent Number: 5,790,806
[45] Date of Patent: Aug. 4, 1998

[54] CABLE DATA NETWORK ARCHITECTURE

[75] Inventor: Francis Richard Koperda, Suwanee, Ga.

[73] Assignee: Scientific-Atlanta, Inc., Norcross, Ga.

[21] Appl. No.: 627,062

[22] Filed: Apr. 3, 1996

[51] Int. Cl.$^6$ .......................... G06F 13/14; G06F 13/38; H04N 7/10
[52] U.S. Cl. .................. 395/200.82; 395/200.48; 395/200.68; 348/12
[58] Field of Search .................. 395/200.09, 200.47, 395/200.48, 200.49, 200.53, 200.54, 200.57, 200.68, 200.82; 348/7–15; 455/3–9, 3.1, 4.1, 4.2, 5.1, 6.2

[56] References Cited

U.S. PATENT DOCUMENTS

| | | |
|---|---|---|
| 3,943,447 | 3/1976 | Shomo, III . |
| 3,985,962 | 10/1976 | Jones et al. . |
| 4,494,138 | 1/1985 | Shimp . |
| 4,498,169 | 2/1985 | Rozmus . |
| 4,520,508 | 5/1985 | Reichert, Jr. . |
| 4,528,663 | 7/1985 | Citta . |
| 4,530,008 | 7/1985 | McVoy . |
| 4,533,948 | 8/1985 | McNamara et al. . |
| 4,534,024 | 8/1985 | Maxemchuk et al. . |
| 4,553,161 | 11/1985 | Citta . |
| 4,574,305 | 3/1986 | Campbell et al. . |
| 4,616,214 | 10/1986 | Naito . |
| 4,633,462 | 12/1986 | Stifle et al. . |
| 4,677,467 | 6/1987 | Hayes . |
| 4,920,533 | 4/1990 | Dufresne et al. . |
| 4,922,244 | 5/1990 | Hullett et al. . |
| 4,922,488 | 5/1990 | Niestegge . |
| 4,942,572 | 7/1990 | Picard . |
| 4,977,557 | 12/1990 | Phung et al. . |
| 5,001,707 | 3/1991 | Kositpaiboon et al. . |

(List continued on next page.)

OTHER PUBLICATIONS

"Demand Side Management Considerations in Advanced Network Deployment," D. Ericson, et al., *1994 NCTA Technical Papers*, 43rd Annual Convention, National Cable Television Association, Washington, D.C., 1994, pp. 8–14.

"Rich Online Services As the Archetype for Interactive TV," D. Williams, et al., *1994 NCTA Technical Papers*, 43rd Annual Convention, National Cable Television Association, Washington, D.C., 1994, pp. 21–35.

(List continued on next page.)

*Primary Examiner*—Mark H. Rinehart
*Attorney, Agent, or Firm*—Kenneth M. Massaroni; Kelly A. Gardner; Hubert J. Barnhardt, III

[57] ABSTRACT

A cable data network architecture includes a master head-end, at least one distribution hub connected to the master head end via a first communication link, and one more more user modems connected to the distribution hub(s) via a second communication link. The master head end includes an inter-hub communications switch, a network controller, a network element manager, and one or more external communication links. The distribution hub includes at least one radio frequency modulators for modulating and transmitting data, at least one demodulator for receiving and demodulating return data, a link access control computer for controlling transmission and reception of data by the distribution hub, a hub element manager for detecting faulty communications to and from the distribution hub, and a local switch for switching data between the modulators, the demodulators, the link access computer and the hub element manager within the distribution hub. The user modem(s) includes a tuner for determining a channel for receiving data from the distribution hub, a demodulator for demodulating the received data, an address recognition circuit for determining whether an address associated with the data corresponds to an address served by the user modem, a modulator for modulating transmission data to be transmitted by the user modem, a tuner for determining a transmission channel for transmitting the transmission data, and a timing and control circuit for determining when the user modem transmits the transmission data to the distribution hub over the second communication link.

24 Claims, 19 Drawing Sheets

U.S. PATENT DOCUMENTS

| | | |
|---|---|---|
| 5,051,742 | 9/1991 | Hullett et al. . |
| 5,081,622 | 1/1992 | Nassehi et al. . |
| 5,124,981 | 6/1992 | Golding . |
| 5,128,937 | 7/1992 | Khalil . |
| 5,142,532 | 8/1992 | Adams . |
| 5,157,657 | 10/1992 | Potter et al. . |
| 5,173,898 | 12/1992 | Heinzmann et al. . |
| 5,184,345 | 2/1993 | Sahni . |
| 5,185,737 | 2/1993 | Nassehi et al. . |
| 5,187,735 | 2/1993 | Herrero Garcia et al. . |
| 5,210,750 | 5/1993 | Nassehi et al. . |
| 5,231,630 | 7/1993 | Ishibashi et al. . |
| 5,251,301 | 10/1993 | Cook ............ 395/200 |
| 5,329,308 | 7/1994 | Binns et al. ............ 348/14 |
| 5,347,304 | 9/1994 | Moura et al. . |
| 5,351,043 | 9/1994 | Hullett et al. . |
| 5,361,262 | 11/1994 | Cheung . |
| 5,367,329 | 11/1994 | Nakagaki et al. . |
| 5,387,942 | 2/1995 | Lemelson . |
| 5,390,169 | 2/1995 | Bernstein . |
| 5,390,170 | 2/1995 | Sawant et al. . |
| 5,390,175 | 2/1995 | Hiller et al. . |
| 5,392,277 | 2/1995 | Bernstein . |
| 5,512,935 | 4/1996 | Majeti et al. ............ 348/9 |
| 5,534,913 | 7/1996 | Majeti et al. ............ 348/7 |
| 5,557,319 | 9/1996 | Gurusami et al. ............ 348/11 |
| 5,594,490 | 1/1997 | Dawson et al. ............ 348/6 |

OTHER PUBLICATIONS

"An Integrated Network Management System for Cable Television," J. Anderson, *1994 NCTA Technical Papers*, 43rd Annual Convention, National Cable Television Association, Washington, D.C., 1994, pp. 74–84.

"Network Management System Advantages and Implementation," C. Sucharczuk, *1994 NCTA Technical Papers*, 43rd Annual Convention, National Cable Television Association, Washington, D.C., 1994, pp. 85–88.

"Deploying Telephony Services Over CATV Systems: Systems and Architectural Considerations,"G. Hart, et al., *1994 Technical Papers*, 43rd Annual Convention, National Cable Television Association, Washington, D.C., 1994, pp. 206–218.

"An Optimal Approach to a Full–Service Broadband Communications Network," R. Safadi, *1994 NCTA Technical Papers*, 43rd Annual Convention, National Cable Television Association, Washington, D.C., 1994, pp–416–421.

"CATV Network Planning, A Systematic Approach," A. Martelleto, et al., *1994 Technical Papers*, 43rd Annual NCTA Convention, National Cable Television Association, Washington, D.C., 1994, pp. 422–427.

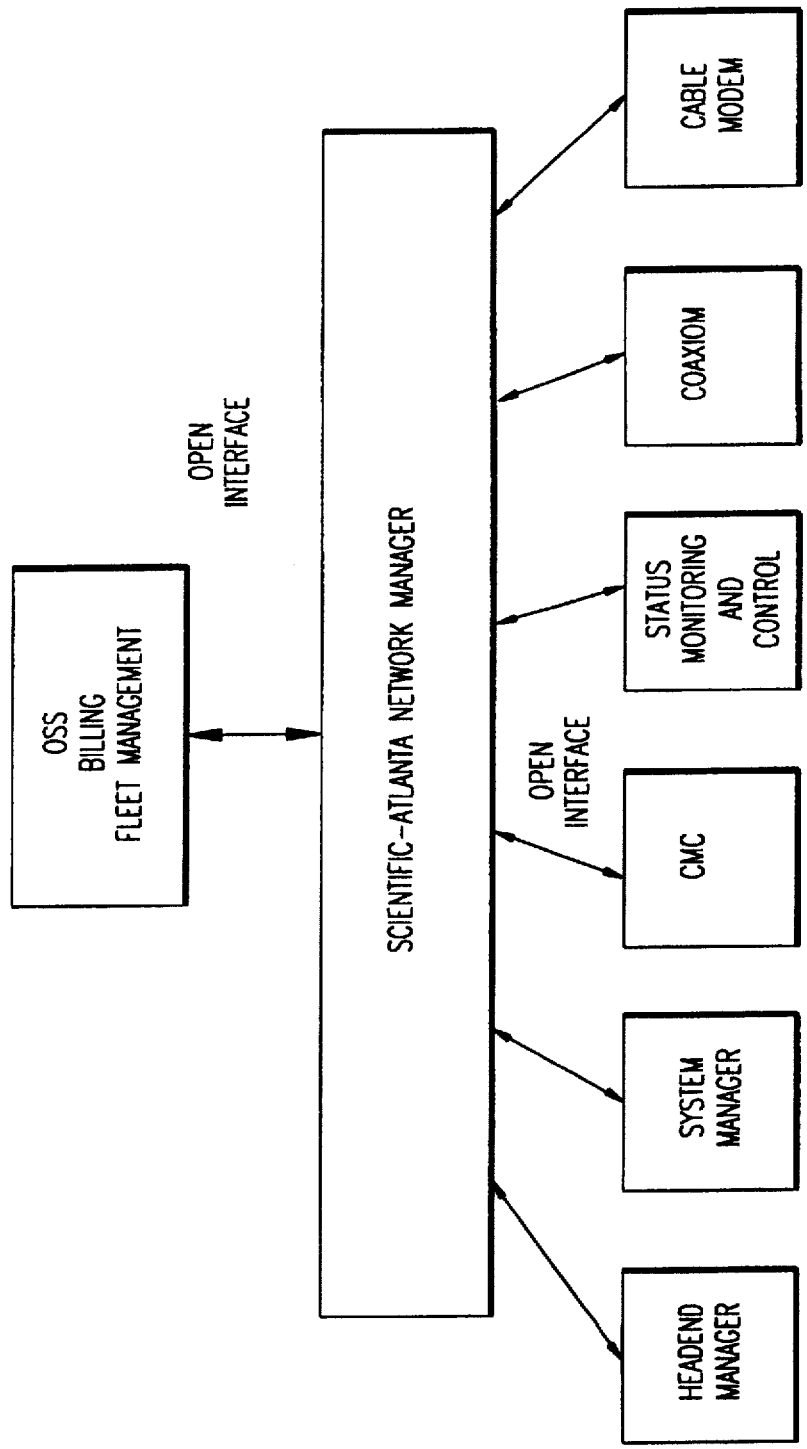

CABLE DATA NETWORK ARCHITECTURE

FIELD OF THE INVENTION

The present invention relates to a cable data network architecture for enabling communication between a master head-end and a plurality of remote communication devices, such as personal computers located in homes and businesses. The present invention further relates to a cable data network architecture for providing on-line services and other applications from a master head-end to a plurality of remote communication devices.

BACKGROUND OF THE INVENTION

Communication networks such as telecommunications systems and cable television systems have provided various types of services to the public for many years. In recent years, as the public demand for numerous types of information and services has increased significantly, new types of networks have been explored and developed to accommodate this demand.

Moreover, with the ever-increasing availability of computer services and applications, there is a need for a single network which provides many different types of services to computers in numerous remote locations. Such a network must be compatible with a variety of computer platforms and operating systems to enable computers to connect into a wide area environment. The network must provide Local Area Network or LAN-like performance and connectivity between remotely linked computers and run as an application on existing computer platforms to prevent the need for an additional designated network management computer. The network must support TCP/IP and connection-less services as well as services such as video-conferencing and voice capability for use with interactive games. Furthermore, the upstream and downstream links of the network must be secure to prevent an unauthorized user from examining information intended for a different user.

In addition to the technical requirements for such a network, the network must also have a low cost for residential applications and enable the service provider to charge customers based on different service levels provided to each customer.

A number of devices are available on the market which enable transfer data from a central location to a home unit over the cable system. However, these devices do not address the issues involved in management of an integrated cable network, including such issues as how to incorporate billing functions; identifying locations at which user information is to be gathered; the provision of queued services; how to manage encryption/decryption functions; how to perform pacing functions to prevent users from "hogging" the links; and how to perform address mapping functions.

In view of these requirements, it is an object of the present invention to provide a cable network architecture which supports a variety of different data streams simultaneously, e.g., videoconferencing, games, on-line services, and LAN emulation for work-at-home applications, wherein the data streams have guaranteed bandwidth, latency, and jitter available on a heavily loaded system. The network architecture according to the present invention supports a wide number of computer platforms, including IBM®, Macintosh®, Sun®, and PowerPC® compatible operating systems and Windows®, UNIX® and OS/2® software systems, and supports connectivity to Wide Area Networks (WANs). The network according to the present invention is scalable to allow growth in both the number of users and the bandwidth per user. Moreover, the network according to the present invention enables efficient network management that will work with existing operator network management stations.

It is a further object of the present invention to provide a system architecture which allows different levels of service for different users, including individual customer bandwidth limitations and access to applications, for example, Internet, forums, or stock price applications. The network architecture according to the present invention should enable flexible billing and selection of service type by the service provider as well as remote diagnostic capabilities. While various components for performing certain specific aspects of such a system are currently available, there is no known architecture which contemplates the integration and operation of all aspects of such a system.

It is an additional object of the present invention to provide a cable network architecture which resolves many issues with respect to management of an integrated cable network, including the incorporation of billing functions; the identification of locations at which user information is to be gathered; the provision of queued services; management of encryption/decryption functions; the implementation of pacing functions to prevent users from "hogging" the links; and the use of address mapping functions.

SUMMARY OF THE INVENTION

The cable data network architecture according to the present invention implements data communications over a cable television plant by connecting a plurality of computers, for example, computers in homes and/or businesses, to one another as well as to a variety of other electronic service provides and other network devices. The architecture provides for two-way communication between the computer and the network. The high speed of the network provides a low cost alternative to existing modems developed for conventional telephone lines.

The cable data network architecture according to the present invention comprises a master head-end, one or more distribution hubs, and a plurality of modems each located, for example, at a remote user location. The master head-end (MHE) contains the primary control equipment for the network. This equipment includes an inter-hub communications switch, connection control equipment, and network management and external communication links. The MHE may connect two or more distribution hubs, for example, wherein each hub is located in a large metropolitan area. For smaller systems, the MHE and distribution hub may be combined in a single location. The distribution hubs include one or more radio frequency (RF) modulators for transmitting information to the plurality of modems located in home and business communication devices. The distribution hubs also include one or more RF demodulators to receive and process return data from the modems and a link access control computer to control upstream access of simultaneously transmitted return The modems at each remote home or business location each connect the cable system to one or more computers. One input/output terminal of the modem is coupled to the cable and the other input/output terminal of the modem is coupled to the computer(s) via a local area network (LAN), e.g., an Ethernet® LAN. The modems act as a bridge between one or more computers and screens traffic to decide which packets of data are to be forwarded onto the cable network. If the modem determines that the address of a packet of information is not a "local" address within the LAN, the modem terminates the medium access control (MAC) frame, generates asynchronous transfer mode (ATM) cells, and forwards the packet onto the cable network to its destination.

The foregoing and other features, aspects, and advantages of the present invention will become more apparent from the following detailed description when read in conjunction with the accompanying drawings.

BRIEF DESCRIPTION OF THE DRAWINGS

FIG. 18 provides a block diagram of a broadband network manager for use in a cable data network according to the present invention.

DETAILED DESCRIPTION

The cable data network architecture according to the present invention will now be described with reference to the accompanying figures.

MASTER HEAD-END (MHE)

The MHE contains the core control systems for the network. In the network architecture according to the present invention, the MHE may be located in a separate geographical location from multiple distribution hubs, or the MHE and distribution hubs may co-reside.

Figure 1:
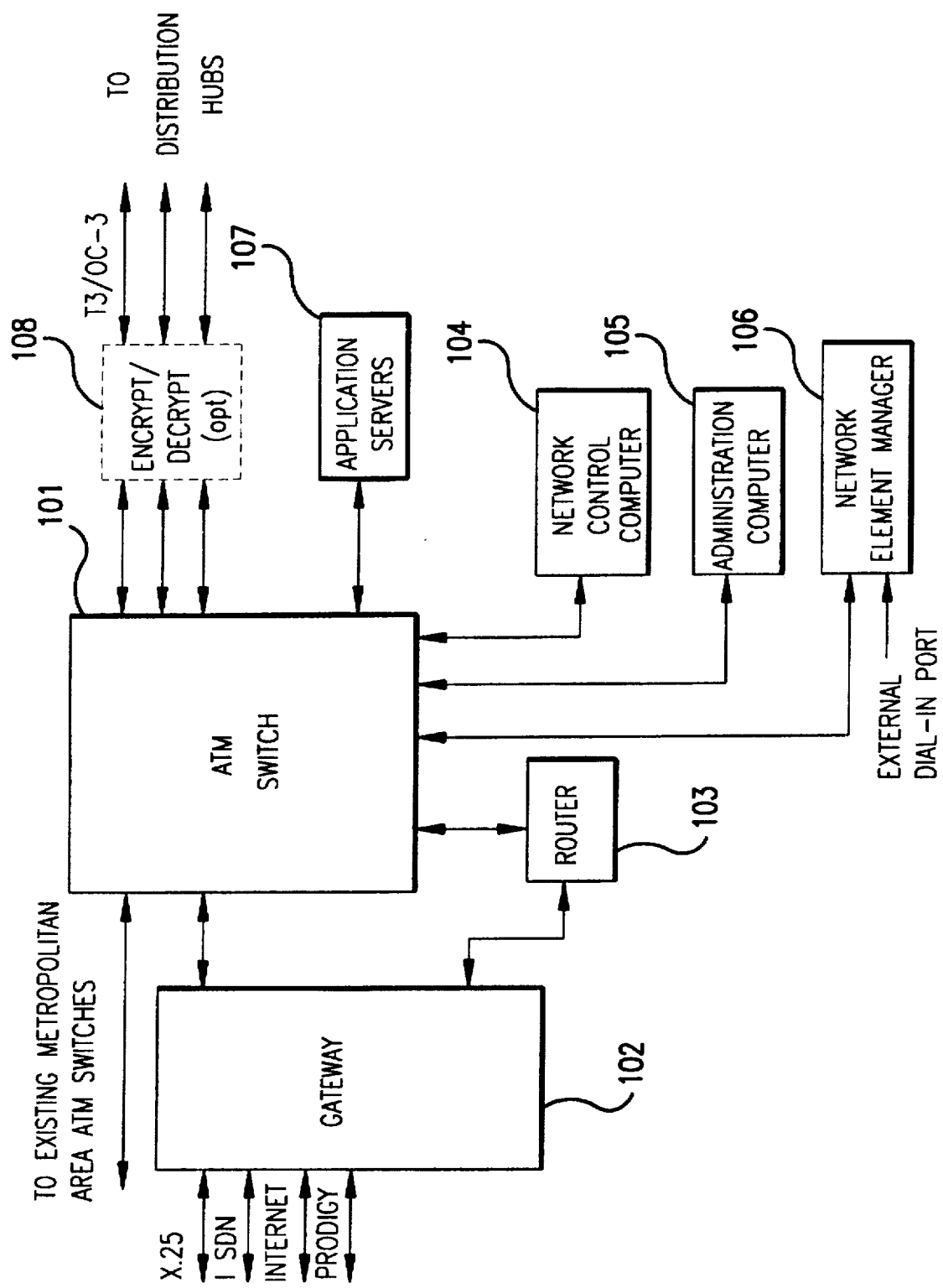
FIG. 1 provides a block diagram of a master head end for use in a cable data network according to the present invention.

With reference to FIG. 1, the MHE includes an ATM switch 101, a gateway 102, a router 103, a network controller computer 104, an administration computer 105, a network element manager 106, application servers 107, and an optional encryption/decryption device 108.

The ATM switch 101 moves the ATM data packets (e.g., 48 bytes of data plus a 5 byte header) around the system based upon their address information. In other words, the switch 101 ensures that each ATM packet is delivered to the correct network address. The switch 101 also supports switched virtual circuits (SVC) and quality of service (QOS) for each connection. To simplify the design, the switch incorporates information about the downstream and upstream links in its route selection process and topography database (not shown) as is known in the art.

The gateway 102 maps ATM cells from the network over to public networks into common protocols such as X.25, prodigy, Internet or ISDN protocols.

The router 103 operates at a higher communication level than the ATM switch 101. While the switch 101 knows nothing about the contents of a message, looking only at the header to determine the address of the ATM packet, the router 103 is capable of evaluating the contents of the ATM packet. However, this additional functionality requires additional processing. Therefore, the router 103 is used to determine the destination of an ATM packet only when the switch 101 is unable to determine the packet's destination based upon the header information.

Optional encryption/decryption device 108 enables bulk encryption of data transmitted to the distribution hubs and bulk decryption of data received from the distribution hubs.

The services and information desired by users of the network architecture according to the present invention reside in application servers. These servers provide such services as navigators, banking, shopping and any other desired information and services.

The administrative computer 105 is a system used by operators of the network to control various functions such as billing for services provided, authorizing units, and service calls. The administrative computer extracts information from the system and responds to requests from other parts of the network. Each operator may use a customized system which is designed to be compatible with the network.

The administrative computer 105 performs such functions as authorization, billing, service level and connection statistics functions. The authorization function may be implemented by providing each customer modem with a unique number, such that the network administrator will provide services selected by the corresponding user to the unique customer modem number. The service level function limits each user to the service level selected and paid for by the user. For example, the network is capable of providing different services to each user. If the user wishes to charge based on the level of network performance such as bandwidth, types of data handled, or the amount of connectivity, the administrator provides this information along with the unit identifier to an authorization database within the administrative computer 105. Billing services may be implemented by obtaining information about which services are activated by the customer during the connection set-up process. The network control computer alerts the administrative computer of the start of each connection. Connection statistics services may be obtained from the link access control unit of each distribution hub (see FIG. 2, described below) which may maintain statistics about every connection traveling in the upstream direction. These statistics may include the number of cells transmitted, the length of the connection, the bandwidth of the connection, and/or the number of cells that require correction via the forward error corrector. These statistics may be presented to the administration computer 105 at the termination of each connection.

The network element manager 106 performs fault detection, error reporting and alert functions. The network element manager does not detect errors itself, but rather monitors various error detection circuits within each link of the network to document the occurrence of transmission errors. An external dial-in port is provided to enable direct access to the information stored in the network element manager 106 such that access to this information may be obtained without relying on the cable data network itself if necessary.

The network control computer (NCC) 104 performs three primary functions: directory services, connection establishment and modem initialization. If there is a need to scale the performance of the NCC, the NCC may be divided into a plurality of computers, for example, three computers, each of which perform one of the three primary functions. In the alternative, numerous NCCs may operate in parallel.

The size of the NCC computer is based on the required performance. For example, in one embodiment of the network architecture according to the present invention, the NCC is capable of handling seven connection setups per second and seven directory service requests per second simultaneously over a sustained period of time. The NCC is attached to the ATM switch 101 via an ATM link using a network-to-network interface (NNI) over a permanent virtual connection (PVC) link.

The modem initialization or boot process is as follows. When a modem is connected to the network, it searches the RF channels of the network to determine which RF channel (s) contains information for the data network (in contrast to RF channels used for television, telephone, meter reading, and other services). Once the modem has identified its own transmission channel, it then determines where on the upstream RF channel(s) to transmit and obtains information about the network from the MHE.

In the cable data network according to the present invention, there are multiple receive and transmit channels through which data is transmitted to and from the home modem. Therefore, the optimal data path through the network must be calculated based upon the bandwidth resource of the cable portion of the network. To perform this function, a the NCC 104 receives information on the type and amount of bandwidth needed for a connection. The NCC 104 then identifies a path through the cable by selecting the proper modulator and demodulators, ensures that the connection is allowed, and communicates with the respective ATM switch (es) 101 to complete the network route.

The directory service function of the NCC 104 involves mapping between various address protocols that may be used by various users on the network. Each of the protocols used in the network has its own name and address structure. A name may move to different addresses. Just as in telephone directory services, inquiries must be made to a specific address. The person or name may not be at that address, so the caller may need to try another address. The network environment includes a mixture of protocols some of which have names and some of which have addresses. Several common name/address servers that may be included in the network are E. 164 addressing (up to 20 byte files similar to standard telephone numbers); X.500 Name server (ANSI standard for distributed name server); 48 Bit IEEE address (6 byte address commonly found on LANs); 64 Bit IEEE address (extended address); IP addressing (device would become an IP domain name server).

A Directory Name Server (DNS) (not shown) within the NCC 104 receives requests for name/address translation so that the user can find the requested destination. The format of the message that requests the information may be selected from existing directory message standards, including SMTP and X.400.

The DNS performs several tasks. Firstly, the DNS receives and responds to directory request messages. Secondly, the DNS maintains a database of names and addresses by initializing, updating and deleting name/address entries.

The DNS communicates with a variety of other network elements to get the information requested to fill the name/address database. The name and address information that is entered into the database includes names and/or addresses for the modems at each customer site, the names and/or addresses of the PCs attached to the modems, and the names and/or addresses of the network elements. Modem names/addresses may consist of an IEEE 48 bit address to be read by the subscriber and given to the system administrator, a temporary IP address of the SNMP agent in the modem, and a bridge address as seen by the modem to gather bridge statistics. The PC name/address information may include an IEEE 48 bit address of the corresponding Ethernet adapter, a temporary or permanent IP address of the computer, and an X.500 name of the user of the PC. Network element name/address information may include E. 164 addresses of local application servers, IP addresses of local application servers, and IP addresses of network management entities such as modulators, demodulators, and switches.

Figure 1A:
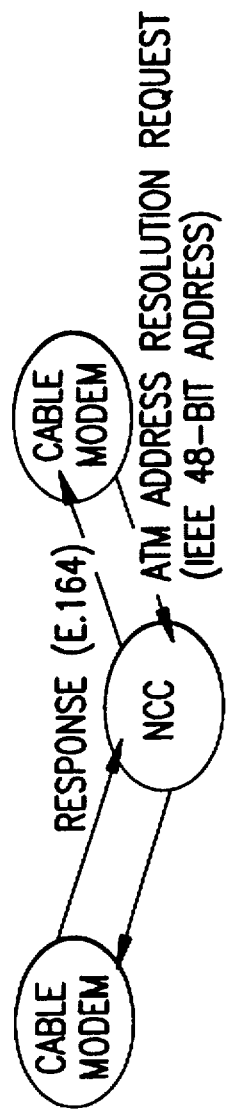
FIG. 1A illustrates IEEE address to ATM address mapping of the master head end of FIG. 1.

Data transmitted from one user modem to another user modem in the cable data network according to the present invention is directed through the DNS which maps between addresses of the various protocols which are used by the components of the cable data network. For example, as shown in FIG. 1A, the DNS maps a first user's ATM address resolution request such as IEEE 48-bit address to the appropriate ATM or IEEE address. In the case of an ATM address, this address is used to setup an ATM connection.

According to one embodiment of the cable data network architecture of the present invention, the IEEE 48-bit address is the base identity for the stations attached to the cable plant. A number of network protocols such as IP, IPX, etc., may be used to route the packets outside the ATM network. Therefore, two examples of the address resolution process in the network architecture according to the present invention are provided below.

EXAMPLE 1:

IEEE 48-bit address to IEEE-48 bit address

When the cable modem receives a packet (an Ethernet packet) with a destination address (DA) for which it has no associated E. 164 address, the following steps are performed:

1. Upon receiving the first packets with an unknown DA (ATM address is unknown), the modem setup a connection to the NCC to resolve the associated E. 164 address: assuming that the ATM address of the NCC is already known to the modem.

2. If NCC has the associated E.164 address to the requested MAC address, it returns the E.164 address to the source modem and it starts the case 1 procedures (described below).

3. If NCC does not have the E.164 for the DA and no further routing protocol such as IP is used. NCC will return null address to the modem.

EXAMPLE 2:
IP station to IP station
Case 1: Local IP address to Local IP address
Address recognition steps based on RFC1577 model:

1. The address resolution protocol (ARP) function located in the PC protocol stack send out an Ethernet broadcast packet carrying the router's IP address (ATM ARP).
2. The Cable Modem forward the broadcast packet to the NCC (ATM ARP) since it is a broadcast packet.
3. NCC returns the attached IP router's E.164 ATM address to the Cable Modem.

Steps not based on RFC1577 model (a direct ATM connection is setup between the two modems):

1. The ARP function located in the PC protocol stack send out an Ethernet broadcast packet carrying the router's IP address (ATMARP).
2. The Cable Modem forward the broadcast packet to the NCC (ATMARP) since it is a broadcast packet.
3. NCC returns the attached target IP station E.164 ATM address to the Cable Modem.

Case 2: Local IP address to Distant IP address
The address resolution procedure is similar to the case 1 based on RFC1577 model.

Case 3: Distant IP address to Local IP address
This is the case that the attached IP router is looking for the destination IP station. The IP router send an ARP message to NCC through the ATM connection between the router and the NCC. The E.164 ATM address is then retrieved from the NCC database based on the target IP address and returned to the router. An ATM connection is then setup to the target cable modem carrying the IP traffic.

EXAMPLE 3:
IP Station to IEEE 48-bit address ARP
Scenario 4: IEEE 48-bit address to IP station InARP
Scenario 5: E.164 address to IEEE 48-bit address
This scenario occurs when there are more than one station on the Ethernet segment attached to a cable modem.

In the above-described examples, address recognition protocol (ARP) and inverse ARP (INARP) are protocols which enable one person in one small user group (e.g., a user on a LAN) to reach another person in another small user group anywhere in the world. These protocols use pointers to link the hierarchy of established domains worldwide to locate an individual person in a small user group to whom information is addressed.

The connection from the MHE to the various hubs is via, for example, a fractional T3, a clear channel T3, or an OC-3. To the switch 101, this link appears to be another trunk because there are number of destination addresses located at each side. For simplicity, each monitor at the hub has a separate link back to the switch. As traffic characteristics change, a smaller switch may be inserted at the hub to handle local switching of the traffic and allow aggregation of multiple lower speed T3s to higher speed OC3s.

DISTRIBUTION HUB

Figure 2:
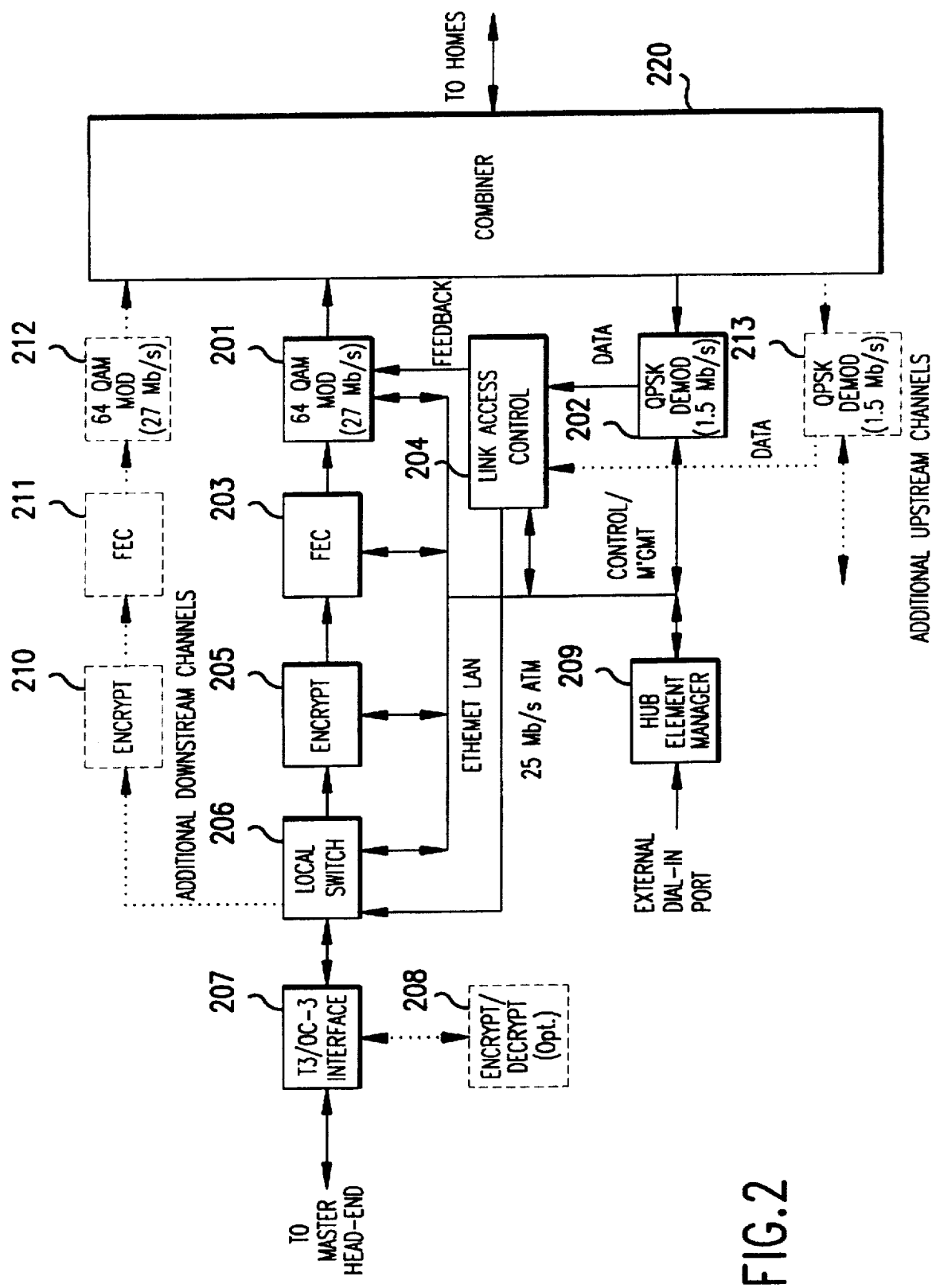
FIG. 2 provides a block diagram of a distribution hub for use in a cable data network according to the present invention.

FIG. 2 provides a functional block diagram of a distribution hub for use in the cable data network architecture according to the present invention. The distribution hub includes a modulator 201, a demodulator 202, a forward error correction (FEC) circuit 203, a link access control (LAC) circuit 204, an encryption circuit 205, a local switch 206, a T3/OC-3 interface 207, an optional encryption/ decryption circuit 208, combiner 220, and a hub element manager 209. Additional downstream channels may be added by including an additional modulator 212, FEC circuit 211, and encryption circuit 210 for each additional channel. Additional upstream channels may added by including an additional demodulator 213 for each additional channel.

Notably, all transmissions between the MHE and the distribution hub(s) are baseband transmissions involving no modulation/demodulation. The typical data rates for these transmissions may be, for example 45 mb per second (T3 channel), 155 mb per second (OC3 channel), or a larger channel such as an OC12, OC24, or OC48 channel enabling communication rates of several gigabytes per second. In the preferred embodiment of the present invention, the link(s) between the MHE and the distribution hub(s) are selected to include as few links as possible to accommodate the needs of the system. An interface 207 is provided in the distribution hub to enable transmission of data to and receipt of data from the MHE.

The optional encryption units 210 and 205 differ from the optional encryption/decryption unit 208 in that encryption/ decryption unit 208 is used to bulk encrypt or decrypt data transmitted between the distribution hub and the MHE while encryption units 205 and 210 are used to individually encrypt data to be transmitted to individual users using a different encryption key from each user rather than bulk encryption.

With respect to the downstream transmission of data in the cable data network according to the present invention, the primary purpose of the distribution hub is to translate a relatively large stream of data received from the MHE into multiple smaller (e.g., 27 mb) data streams which are transmitted to the user modems. Similarly, in the upstream direction, the distribution hub receives multiple relatively small data streams from the user modems and either groups the streams together into one larger stream which is provided to the MHE or sends the smaller data streams back upstream to the home. The routing and grouping of the information is performed by the local switch 206.

Forward error correction circuits (FECs) 203 and 211 provide the mechanism by which transmission errors may be corrected upon receipt by the user modems. This correction device is needed to accommodate the higher probability of transmission errors associated with digital data transmission over a cable network. Each FEC inserts a redundancy code into the data which subsequently enables the receiving user modem to receive the redundancy code and reconstruct bad bits, thereby correcting the transmission errors. Each redundancy code inserted into the data stream is associated with a specific length of data.

Each modulator (e.g., 212 and 201) may be, for example, a 27 MB/s quadrature amplitude modification (QAM) modulator as is known in the art. Similarly, each demodulator (e.g., 202,213) is a quadrature phase shift keying (QPSK) demodulator that separates the data and access method information. The demodulator also includes the error correction based on the algorithms used by the modem. If the security algorithm implemented is for the last hop, the decryption algorithm is also performed in the demodulator.

The link access control (LAC) circuit 204 gathers statistics as to how much each user is transmitting. The LAC circuit 204 also limits the usage of users to what they are paying for and denies users access when they demand too much data transmission capacity (e.g., a user requests a 64-bit transmission capacity when he has only paid for a 32-bit transmission capacity). The LAC 204 also monitors usage statistics and provides this information regarding the status of the upstream transmission link to the downstream link via its link into the modulators (e.g., 201). This feedback information is sent back to the local switch 207 for transmission to the MHE.

The hub element manager 209 performs network management functions. For example, the hub element manager 209 monitors the QAM downstream modulators and upstream QPSK demodulators and periodically polls the user modems to determine who is linked to system and how many errors each modem is experiencing. When, for example, a predetermined level of congestion or error rate is detected, the hub element manager 209 notifies the network element manager 106 of the MHE via a dial-in port such that communication between the hub element manager 209 and the network element manager 106 is not dependent upon the cable data network.

A local area network (LAN), for example, an Ethernet LAN, is used to enable communications between the hub components to allow the hub element manager 209 to detect any problems within the distribution hub itself Data received from the user modems is transmitted from the demodulators to the local switch 206 via, for example, a 25 Mb/s ATM link. The local switch then directs the data upstream or downstream as needed.

Figure 2A:
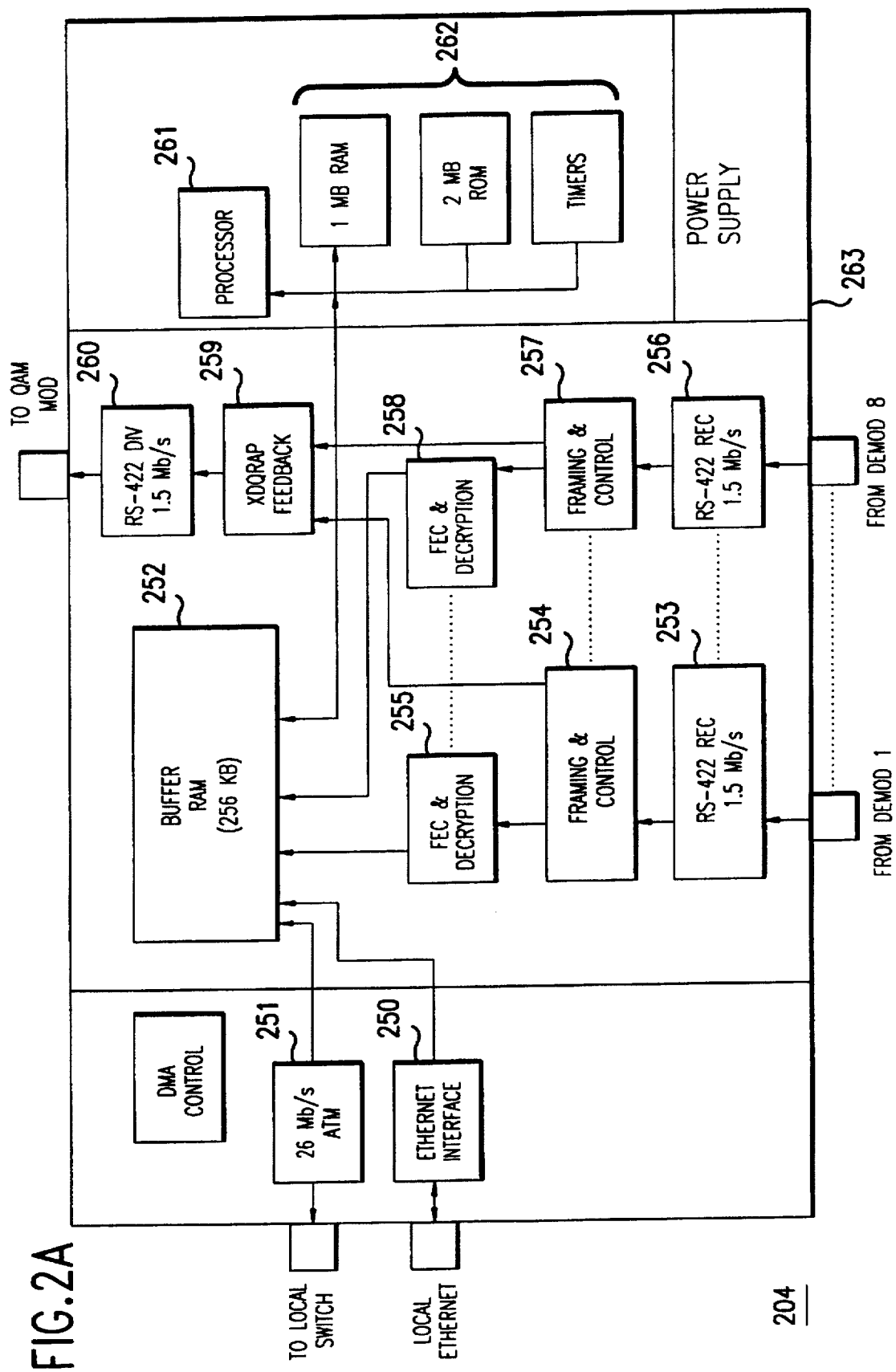
FIG. 2A provides a block diagram of a link access control circuit for use in the distribution hub of FIG. 2.

A link access control circuit for use in the distribution hub of FIG. 2 is shown in FIG. 2A. A local Ethernet interface 250 provides the ability to load information into the LAC circuit 204 from the hub element manager 209 to determine which users are authorized and the level of performance authorized for each user as well as the health of connections (dedicated port, local port 250, ATM port 251).

Each upstream channel coming from the demodulators (e.g., 202, 213) is converted into a digital signal by circuit 253 or 256. Framing and control circuits 254 and 257 reassemble ATM cells from serial to parallel, use framing and control blocks. FEC and decryption circuits 255 and 258 correct insufficient data transfer and decrypt received information using each individual user's decryption key.

For example, the LAC circuit 204 may be coupled by a dedicated link to each upstream demodulator via an HDLC link operating at 1.5 Mb/s via an RS-422 interface. The LAC circuit may handle up to 8 units for each downstream channel. The requisite feedback information to tell the modems the status of their upstream transmission is sent via another dedicated HDLC, 1.5 Mb/s, RS-422 link 260 to a downstream quadrature amplitude modulation (QAM) circuit where it is multiplexed into the downstream traffic. The aggregated data traffic may be sent via a dedicated 25 Mb/s ATM link 251, back into the local switch for relay to the downstream modulator or the ATM switch in the Master Head-End depending on the desired destination. According to one embodiment of the network architecture according to the present invention, the maximum throughput for this unit is approximately 188 Kcells/sec. A feedback circuit 259, for example an extended QRAP feedback circuit is also provided.

A buffer random access memory 252 is provided or temporary data storage. Information received by the LAC circuit 204 is stored directly in the buffer memory 252 without intervention of a processor (e.g., 261). This feature is referred to as direct memory access (DMA).

Processor 261 is programmed with a scheduling algorithm which enables the processor 261 to monitor the amount of information transmitted by each of the users. The processor 261 then instructs the downstream modulator (e.g., 201, 212) to send either a signal denying or passing the transmissions from the user. For example, if a user tries to exceed its authorized transmission bandwidth, it will be notified that the transmissions cannot be sent. If it continues to try, the information will not be forwarded to the local switch, thereby locking out the user's transmissions. The processor 261 requires a small amount of buffering memory 262 to store necessary processing information. A power source 263 is also provided.

The primary tasks for the Link Access Control may include:

1) Obtaining the Send ID, priority and CRC from the minislots.

2) Obtaining the ATM cell from the data portion of the upstream channel, correcting the data using the attached FEC, and performing the decryption function if the upstream security is enabled.

3) Transmitting immediate feedback of the upstream minislot and dataslot status to the QAM modulator for downstream transmission to the sending modems. If a modem is exceeding its allotted bandwidth, the request will be rejected.

4) Providing the data portion to various queues depending on the type of connection that was initiated. At the appropriate time the cells are transmitted upstream to the local switch. This metering of the traffic is required to both police the upstream traffic and to ensure that large bursts of data do not adversely effect the rest of the ATM network.

5) Transmitting the data to the local switch.

6) Maintaining statistics about the connection. At the end of the connection, the information is forwarded to the Administration Computer for storage.

Types of statistics to be collected include:
Bandwidth of connection;
Length of connection;
Total number of cells transmitted;
Bit error rate;
Source and destination addresses;
Start time of connection; and
Number of cells rejected because they were in excess of requested bandwidth.

MODEM DESIGN

Figure 3:
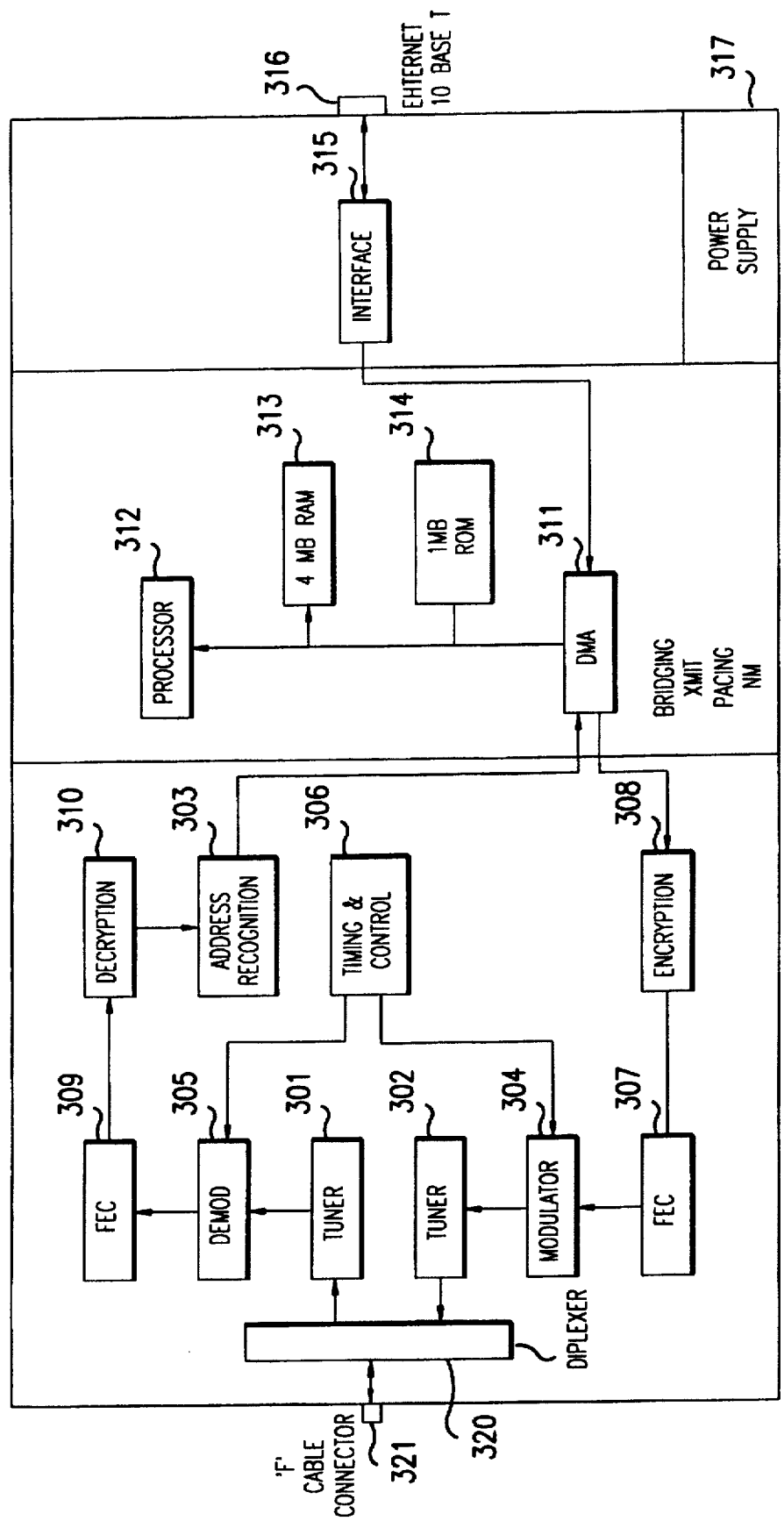
FIG. 3 provides a block diagram of a user modem for use in a cable data network according to the present invention.

One embodiment of a user modem for use in the cable data network architecture according to the present invention is illustrated in FIG. 3.

With reference to FIG. 3, the user modem is designed to connect to a standard Ethernet 10 Base T interface (a LAN interface) on one side and the cable network on the other. Each modem has an independent power supply powered by line voltage. The customer premise may have multiple devices attached to this interface; therefore, the modem must perform a standard bridging function of only forwarding packets destined for machines not on its link.

Each modem includes one or more tuners (e.g., 301, 302) having, for example, a 15–28 MHZ upstream bandwidth and a 150–750 MHZ downstream bandwidth. The modem also includes an address recognition circuit 303; an Ethernet connection 316 to the user's computer; and Ethernet bridging and ATM mapping circuitry including DMA 311, a processor 312, and accompanying random access memory (RAM) 313 and read-only memory (ROM) 314 devices. The modem further includes a timing and control circuit 306 which provides quality of service for each connection, including pacing/spacing and bandwidth allocation services. Modulator 304 may perform, for example, 1.5 Mb/s QPSK modulation in a 1 MHZ bandwidth. Demodulator 305 may perform, for example, 64 or 256 QAM demodulation in a 6 MEz channel.

The modem of FIG. 3 provides separate tuner paths and modulation/demodulation techniques for the upstream and downstream data paths in the cable data network according to the present invention.

The downstream path includes a tuner 301, a demodulator 305, an FEC circuit 309, a decryption circuit 310 and an address recognition circuit 303. The address recognition circuit 303 screens data to determine which data is destined for this modem of for another modem in the network to insure that only data with addresses corresponding to this modem are received.

A timing and control circuit 306 keeps track of framing of data to identify control information and actual data received by modem.

The upstream path includes an encryption circuit 308, an FEC circuit 307, a modulator 304 and a tuner 302. Furthermore, since data transmission in the upstream direction is multipoint (all user modems) to point (a single distribution hub or the MHE), all information from each user modem is transmitted to a single location. To accomplish this, transmissions from each user modem must be coordinated in some fashion. The timing and control circuits 306 of each user modem perform this function by controlling when each modem transmits, in other words, by telling individual modems when to transmit and when not to transmit in order to enable modems to share the cable network. Thus, the timing and control circuits 306 in all of the user modems on the network work together under control of a processor 312 to coordinate functions. This function as a whole is called Media Access Control or MAC. Additional details regarding one MAC format, known as extended DQRAP or XDQRAP are provided in U.S. Pat. No. 5,390,181, issued on Feb. 14, 1995 and "Extended DQRAP (XDQRAP): A Cable TV Protocol Functioning as a Distributed Switch," by G. Campbell and C. Wu, published by the Computer Science Department of the Illinois Institute of Technology in Chicago, Ill. and dated Jun. 24, 1994, both incorporated herein by reference.

As represented by functional block 311, the user modem has direct memory access which enables the received data to be stored directly in the RAM 303 without the intervention of the processor 312. Processor 312 then determines the destination of the received information and whether to alter the format of the information based upon its destination. For example, processor 312 determines whether the received information is to be sent out to the LAN (e.g., an Ethernet 10 Base T LAN 316) via interface 315 (e.g., a standard RJ-45 or RJ-11 Ethernet interface chip which converts Ethernet protocols into bytes which can be stored in the RAM 313), or whether the received cells require reassembly from a variable length Ethernet packet format to an ATM packet (48 bytes). If reassembly is required, the processor 312 reassembles the data into an ATM format including the correct header, segmentation, etc. for transmission onto the cable network via diplexer 320 and cable connector 321. Cable connector 321 may be a standard "F" connector.

According to one embodiment of the network architecture according to the present invention, the modem sustains a throughput of 27 Mb/s downstream for 1 minute. The burst speed is 3.168 MB/s for 1 ms assuming the 27 Mb/s downstream link. The upstream sustains a throughput of 1 Mb/s for 1 minute assuming a 1.5 Mb/s upstream link.

For LAN applications, approximately 70% of the packets are 60 bytes long and 30% of the packets are 1 KB long with a random arrival process.

Since each box containing the user's modem appears to the user's PC as a transparent bridge, some customers may wish to have software to monitor the health and status of the bridge. Where possible, status information such as transmit error bit rate, receive error bit rate, packets sent, throughput, changing upstream channel, and changing downstream channel may be provided over the 802.3 interface 815.

When the modem is first powered on, it scans the available downstream channels looking for special messages that will provide information to begin the activation process. Only one downstream modulator is needed to broadcast the activation message. The activation method arrives on this channel at a rate of, for example, one every second. The modem sets its ATM filter chip to monitor VC id 00/05. The format of the message will be, for example, Protocol ID '00'X. The content of the message will provide:

The upstream channel frequency to use for transmitting;

The VC id to use to perform the upstream registration function;

The VC id to use for the upstream connection management;

The VC id to use for the downstream control information.

According to one embodiment of the present invention, the user modem includes an RJ-45 standard Ethernet connector to enable a connection to 10 BASE-T Ethernet, a transceiver for generating the proper signal levels for 10BASE-T Ethernet including a 20 MHZ crystal for clock generation, and an Ethernet controller which performs Ethernet MAC functions independent of the micro-processor. The controller DMA's data from frame buffers residing in memory. Some glue logic for DMA control may be required. This may be located in the ASIC.

The microprocessor includes a 386EX which is an embedded microcontroller with an embedded DMA controller and Interrupt controller. The two DMA channels may be used by the ASIC and the Ethernet Controller for copying ATM cells and Ethernet frames to/from memory. This module requires a crystal oscillator.

The microprocessor also includes a random access memory, for example, a 512 KB Flash RAM, for storing code and any other non-volatile memory needed, such as connection traffic characteristics. Using Flash, code can be stored in memory and retained during system power-down operations. Additionally, code may be downloaded during the boot process or as new code versions are available.

The microprocessor further includes a second random access memory, for example, a 1MB RAM for general use by the microprocessor.

DATAFLOW WITHIN THE NETWORK ARCHITECTURE

Modem Initialization Procedures

Figure 4:
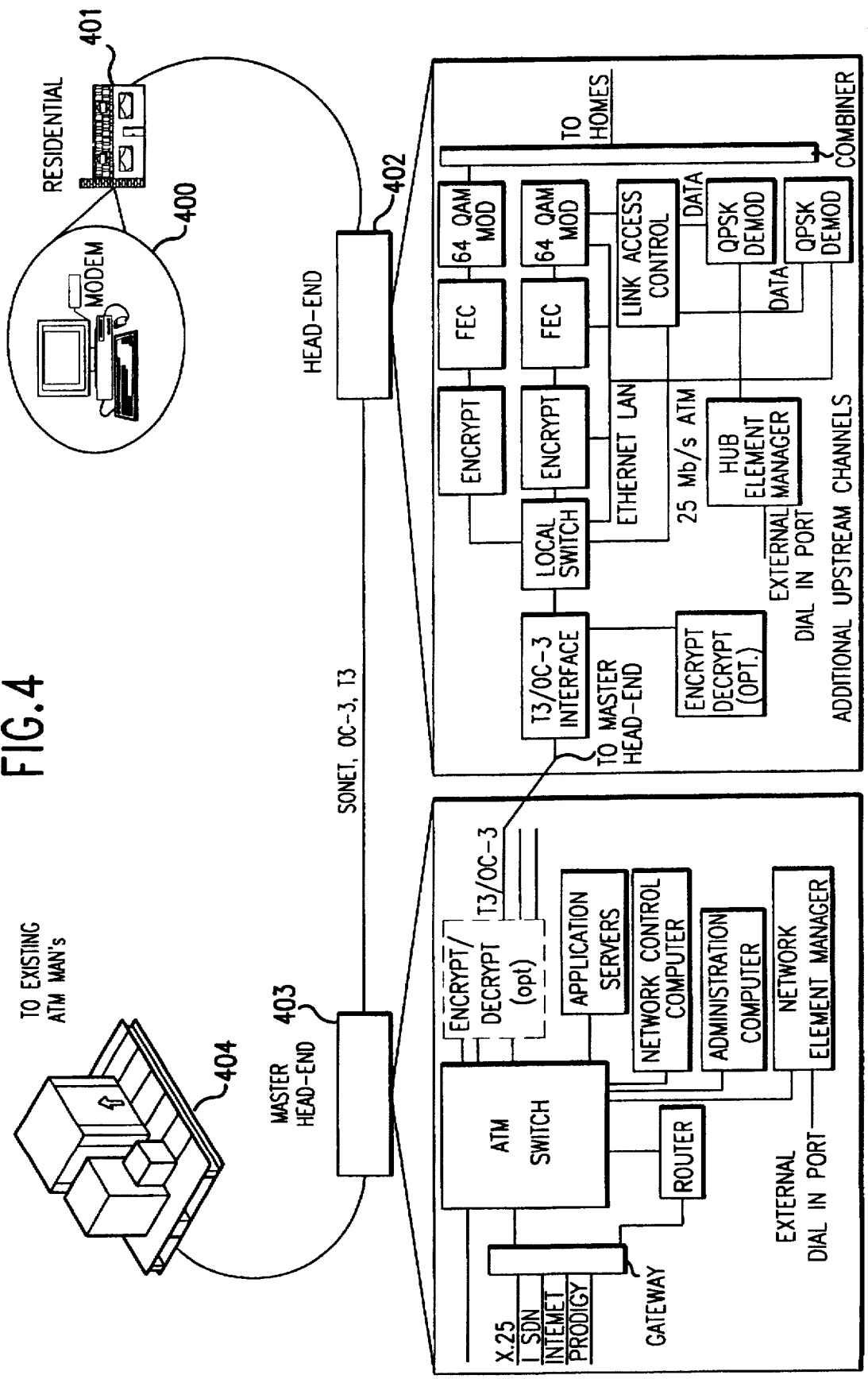
FIG. 4 provides a block diagram of a user modem initialization sequence within a cable data network according to the present invention.
Figure 5:
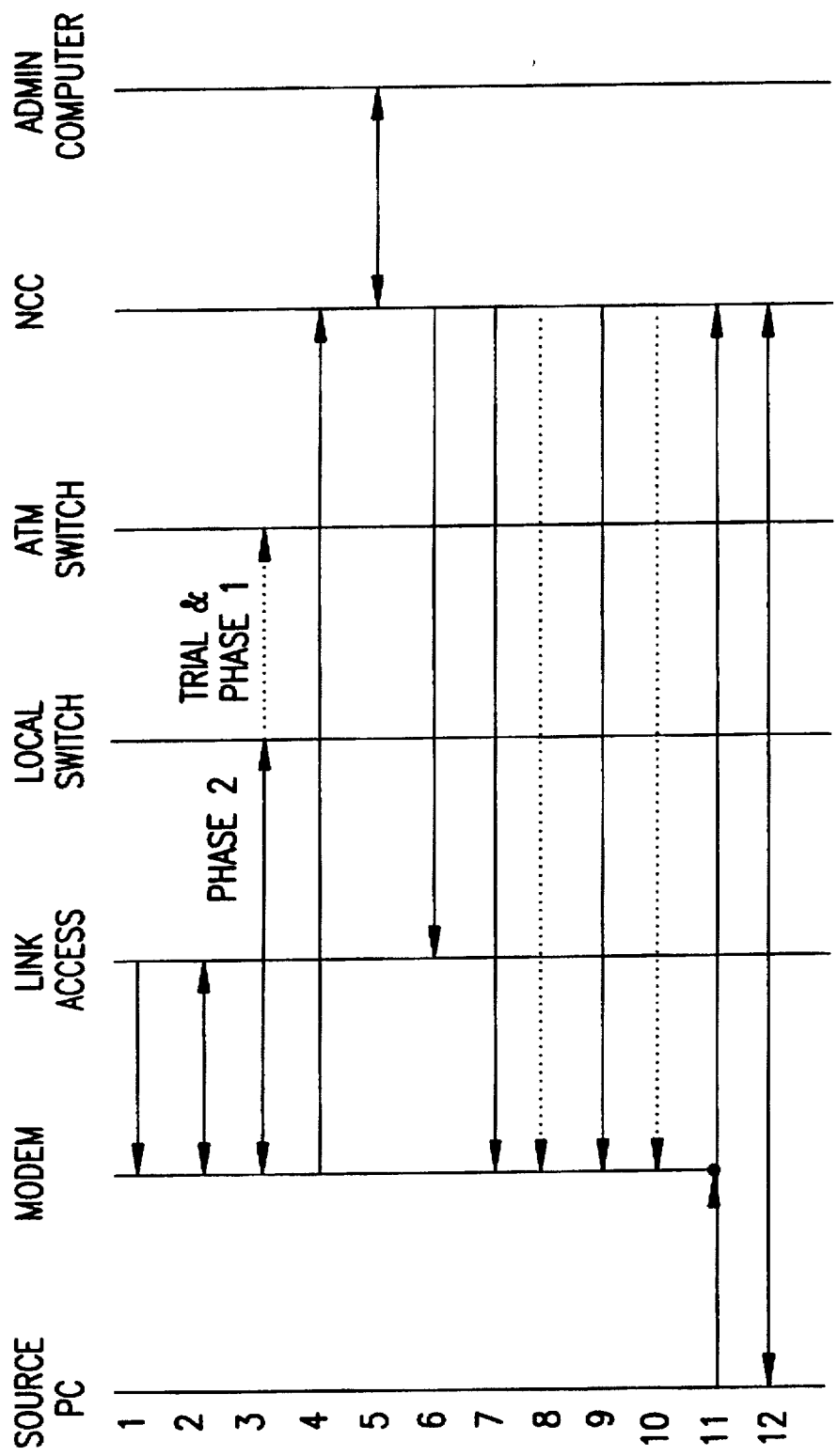
FIG. 5 provides a diagram illustrating a user modem initialization sequence within the cable data network of FIG. 4.

FIGS. 4 and 5 illustrate a modem initialization process for each user modem in the network architecture according to the present invention. When a user modem is turned on, it needs to understand the working environment so that it can participate non-disruptively with the existing users. The modem will power-up in a listen-only mode until it can find a downstream channel that conveys the information on how to begin upstream transmission.

FIG. 4 provides a diagram of a user's personal computer (PC) 400, a user modem 401, a distribution hub 402, an MHE 403, and a link 404 to existing ATM MANs. This drawing illustrates the interconnection between these components.

FIG. 5 illustrates a sequence of initialization steps by which the user modem 401 (or any user modem in the network according to the present invention) accesses the cable data network according to the present invention. Thus, FIGS. 4 and 5 in combination illustrate a modem initialization sequence.

The modem initialization sequence of FIG. 5 includes the following steps (step numbers correspond to the numbers at the left of FIG. 5):

1. Modem scans downstream channels for control initialization signaling. It receives the upstream channel to use, address of NCC, and other configuration information.
2. Modem performs the ranging and level function in conjunction with Link Access Control.
3. Modem registers with the ATM switch and receives its E.164 address.
4. Modem sends E.164 address and its IEEE 48 bit address, device type and type of boot-up required to the NCC.
5. The NCC checks with Administration Computer for authorization and service level. The NCC enters the addresses into directory server.
6. NCC sends authorization for the modem to the Link Access Control.
7. NCC sends authorization and appropriate configuration information to the modem.
8. The NCC may request a code load for the modem to be performed. The code may be stored at the NCC or at a code server.
9. NCC forwards temporary IP address to modem to be used by the SNMP agent.
10. The NCC may request a BOOTP process for the modem to be performed. This may be done at the NCC or at a server.
11. Modem intercepts first message broadcast by PC. Modem registers the PC's IEEE address with directory services at the NCC.
12. The PC may support the IP protocol and need to register its permanent address with the network. It may need a temporary IP and a BOOTP process. This service may be the NCC or a server.

Connection Set-Up Procedures

Figure 6:
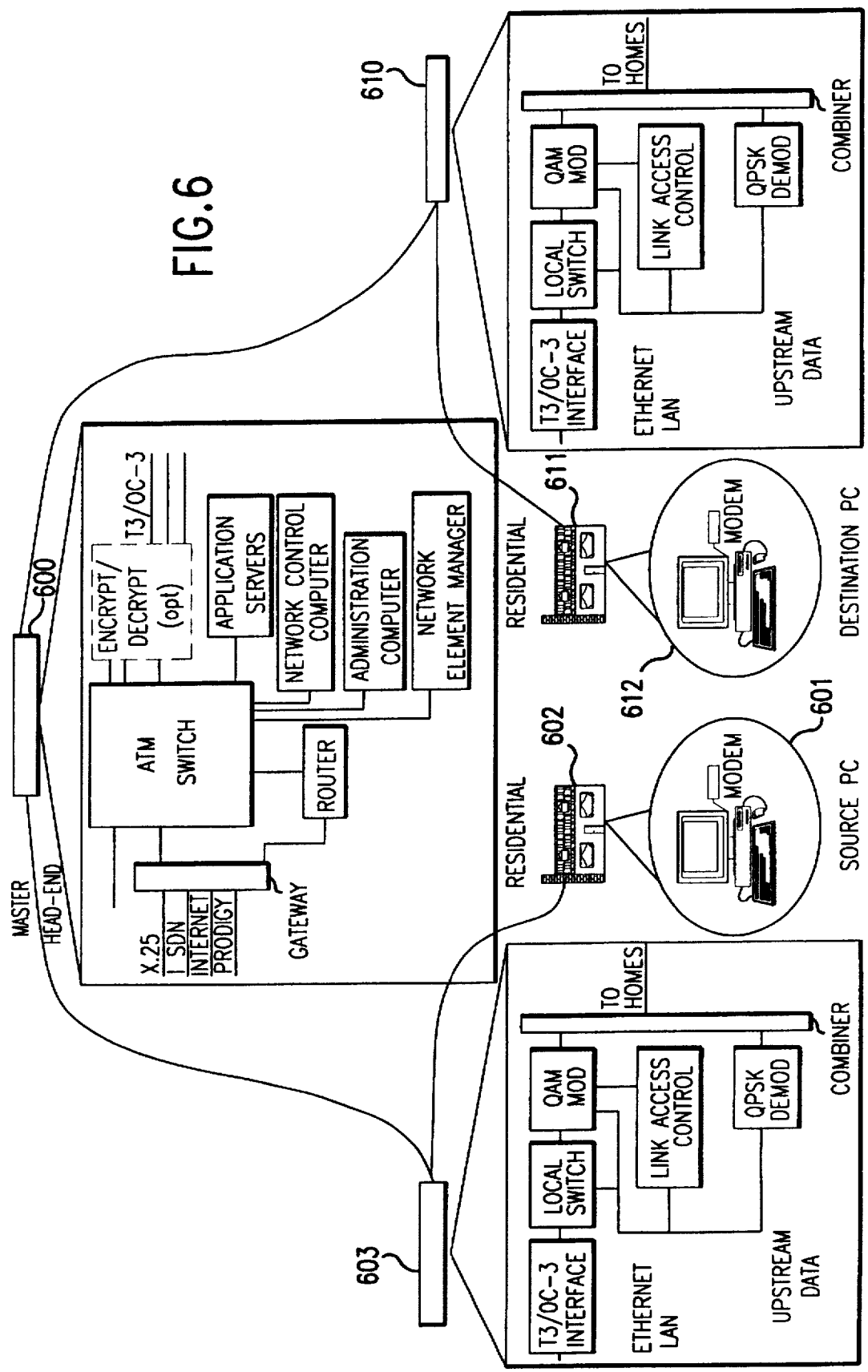
FIG. 6 provides a block diagram of a connection setup procedure in the cable data network according to the present invention.
Figure 7:
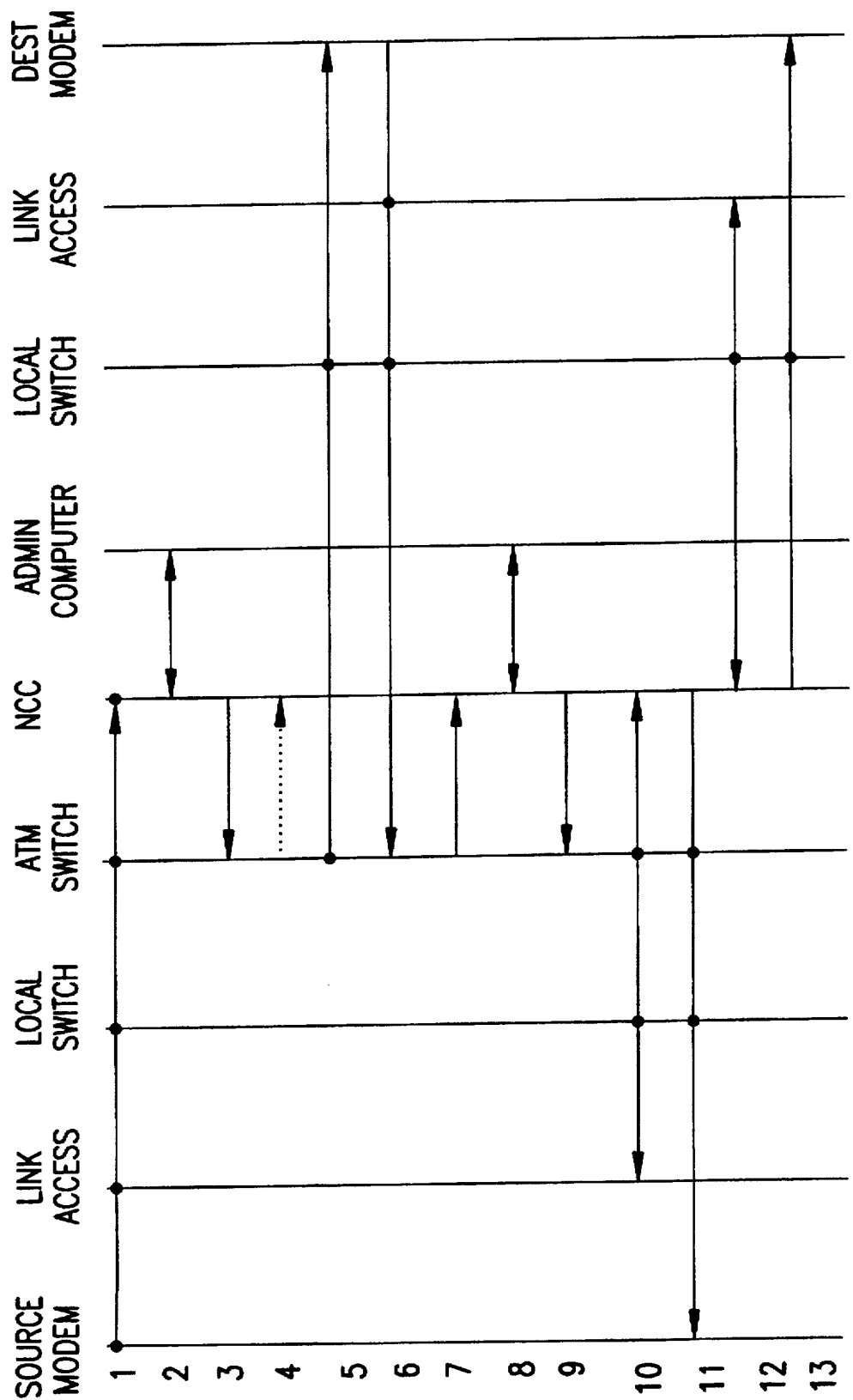
FIG. 7 provides a diagram illustrating the connection setup sequence within the cable data network of FIG. 6.

A connection setup procedure in the cable data network according to the present invention may be based, for example, on the ITU Q.2931 standard. FIGS. 6 and 7 illustrate one possible connection initialization sequence. For purposes of this example, it is assumed that the source and destination personal computers (PCS) are located on separate distribution hubs within the same system. The source has already determined the destination address before starting the connection.

FIG. 6 provides the physical layout of the network, including a source PC 601, a first residential modem 602, a first distribution hub 603, an MHE 600, a second distribution hub 610, a second residential modem 611, and a destination PC 612.

FIG. 7 illustrates the messages that are sent between the different blocks to initialize a connection between the source PC 601 and the destination PC 612. Connection setup is achieved through the following steps:

1. Source PC uses Q.293 1 procedures (PVI-0NCI=5) to setup an ATM connection. The ATM switch receives the signaling message and passes it to the NCC.
2. The NCC confirms calling party's authorization, level of services, etc., from the administration computer. Communications between NCC and administration computer are required. The NCC also calculates the bandwidth required to setup this connection for the source cable channels if it is necessary. If the bandwidth on either the reverse channel or the forward channel is not available, a new frequency assignment is required. Such frequency agility may or may not cause a station to move to different port with respect to the ATM switch.
3. The setup message is then sent back to the ATM network connection control management entity to setup a connection between the source and the destination modem.
4. ATM switch proceeds with the connection-setup process.
5. ATM switch forwards the connection setup request to the destination modem.
6. ATM switch receives the connection-accept message from the designation modem.
7. Once ATM switch receives connection-accept message from the called party, it passes the information to NCC.
8. NCC allocates the up/down channel capacity for the called party and confirms the called party's authorization from the administration computer.
9. NCC informs the ATM switch that the connection has been accepted.
10. NCC confirms that connection setup to the source modem which may carry the information of the newly assigned frequency range.
11. NCC informs the source link access control to allocate bandwidth.
12. NCC confirms the connection to the destination modem which may carry the information of the newly assigned frequency range.
13. NCC informs the destination link access control to allocate bandwidth.

Data Interchange Within the Network

Figure 8:
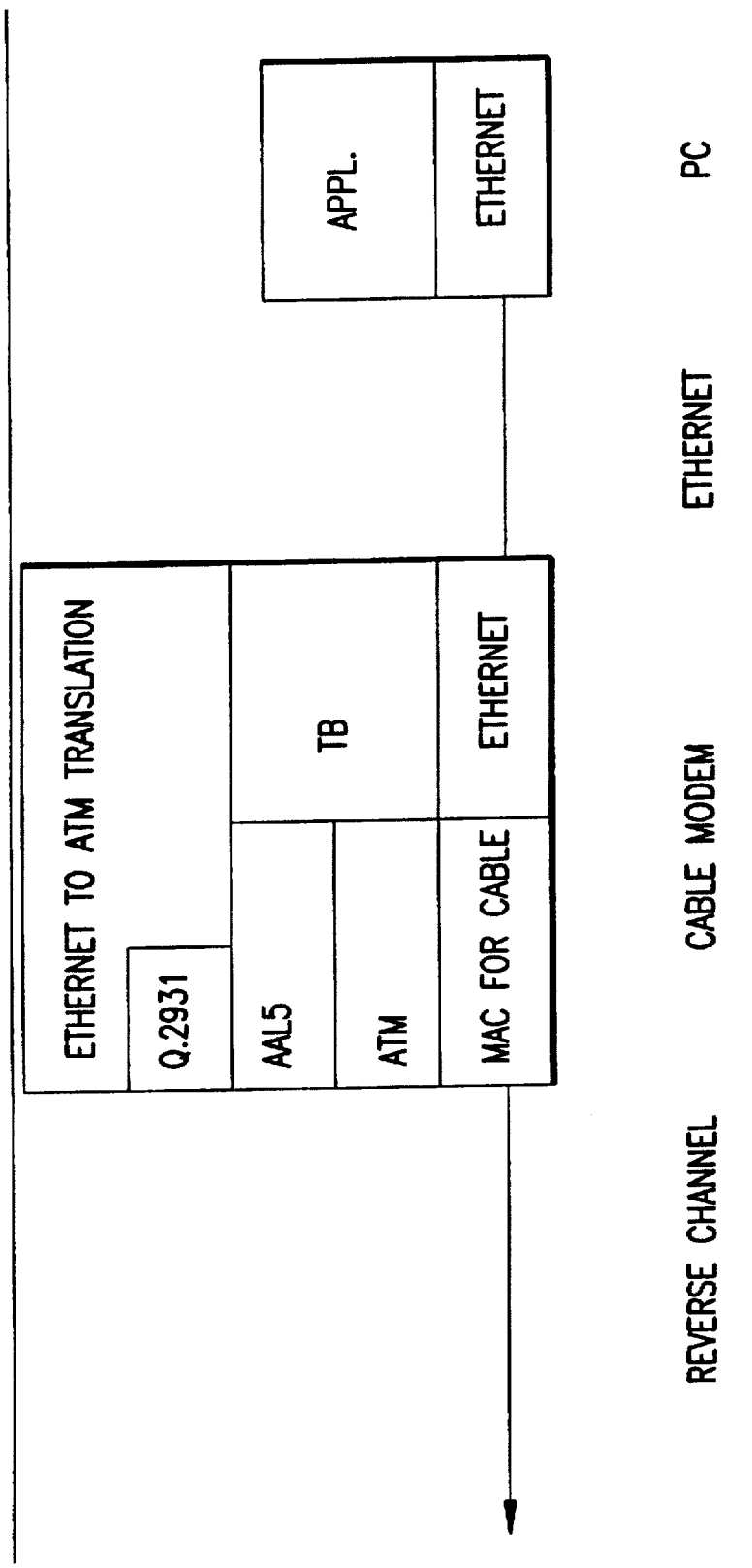
FIG. 8 provides a diagram illustrating a protocol stack at a source modem in a cable data network according to the present invention.
Figure 9:
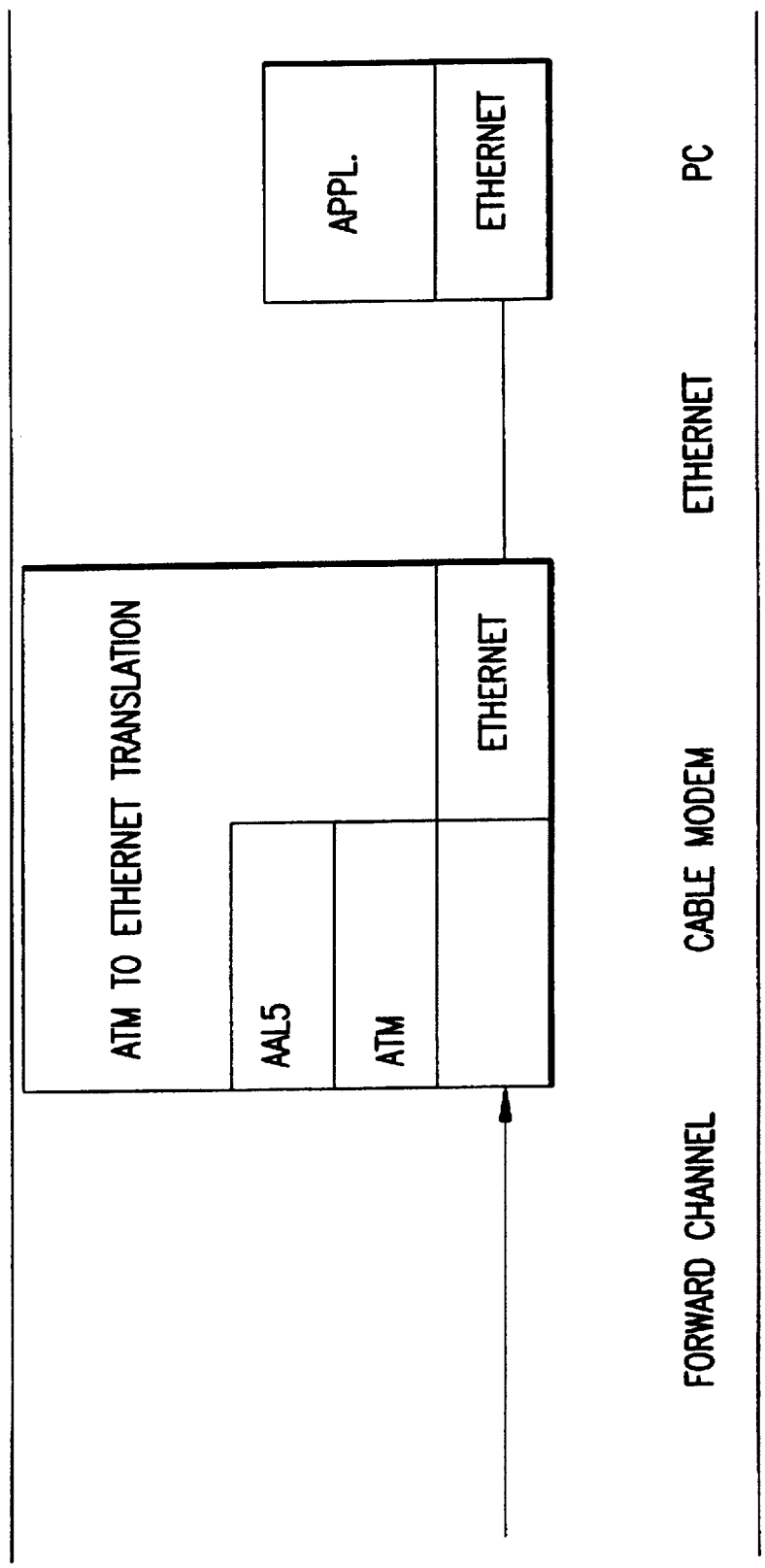
FIG. 9 provides a diagram of a protocol stack at a destination modem in a cable data network according to the present invention.
Figure 10:
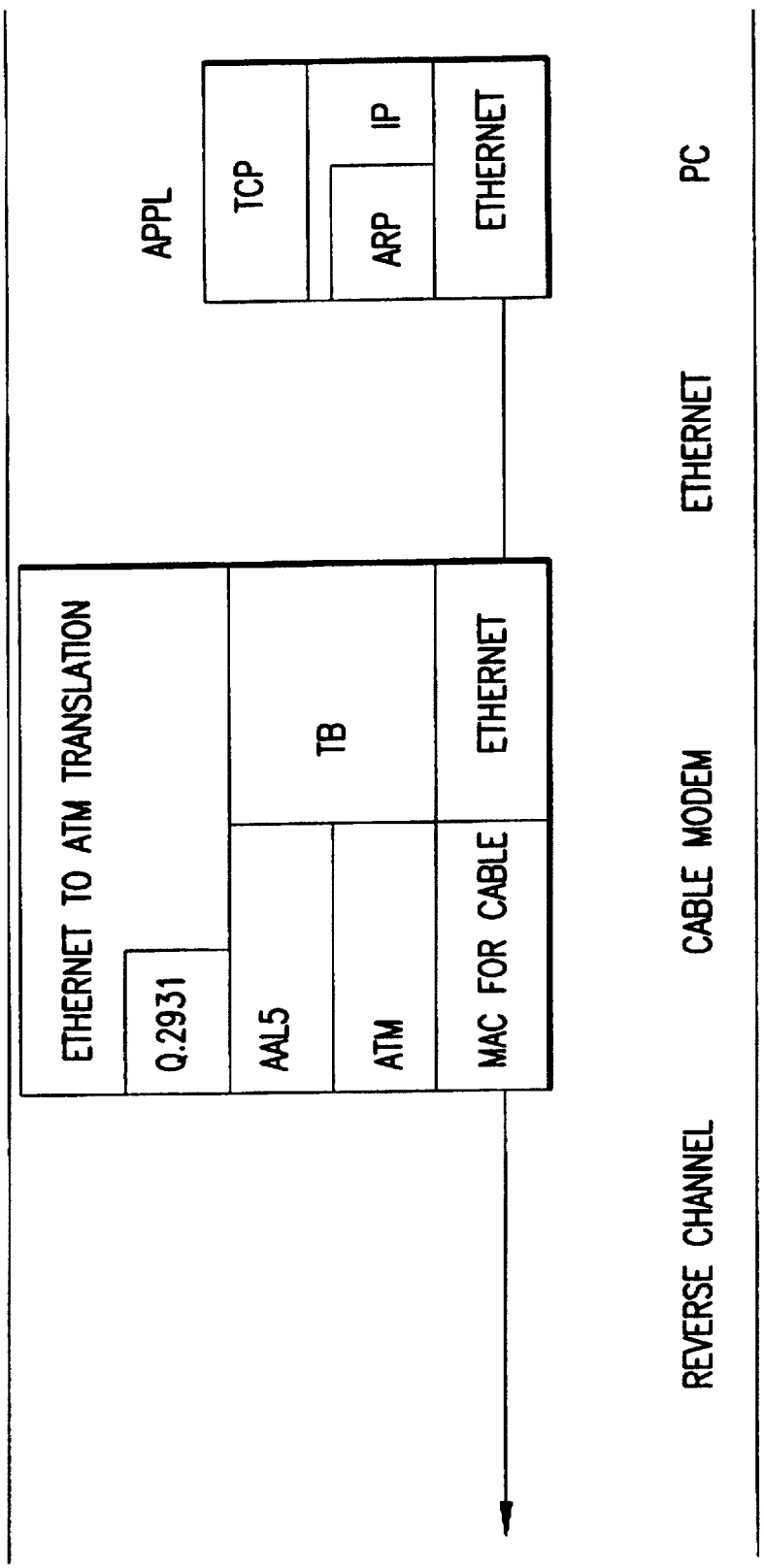
FIG. 10 provides a diagram of a protocol stack involving IP routing.
Figure 11:
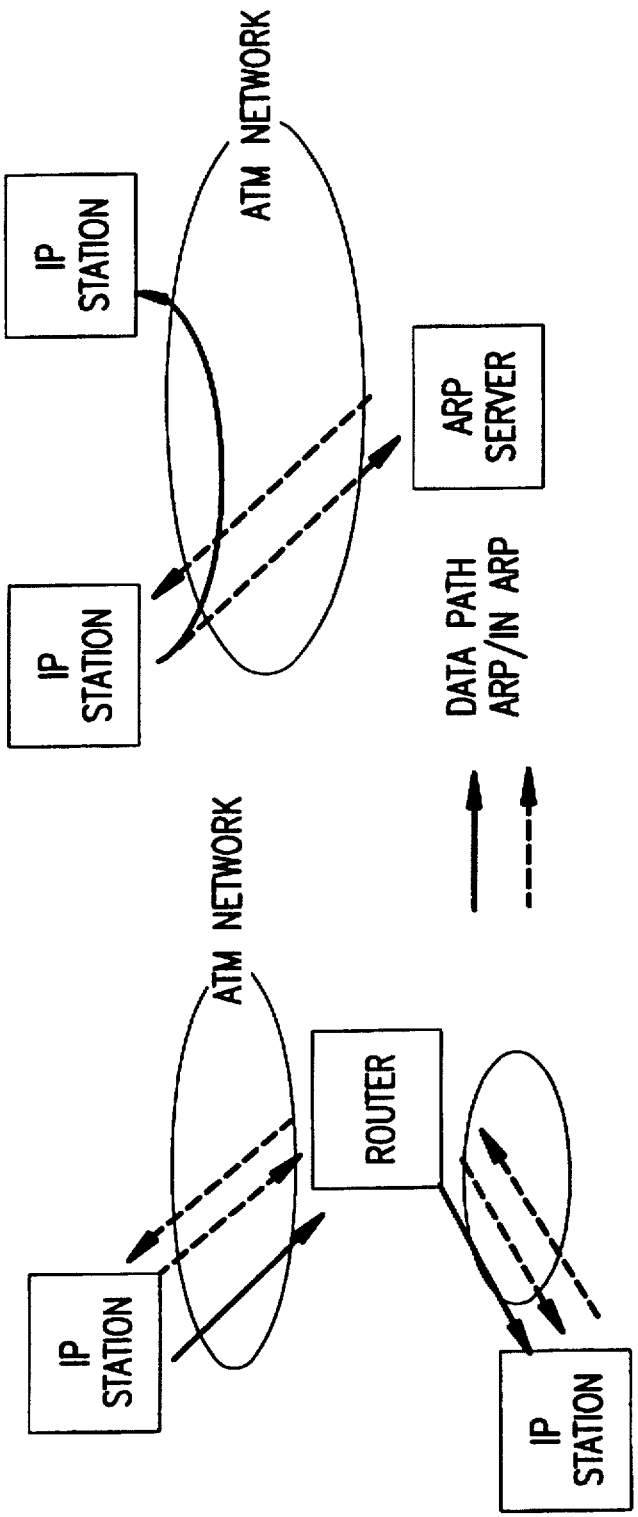
FIG. 11 provides a diagram of the data flow of IP traffic based on an RFC1577 model.

Some examples of data interchange within the network architecture will now be described with reference to FIGS. 8–11. FIG. 8 provides a diagram of a protocol stack at the source modem. FIG. 9 provides a diagram of a protocol stack at a destination modem. FIG. 10 provides a diagram of a protocol stack involving IP routing. FIGS. 8, 9 and 10 are based on the OSI seven-layer model for communications protocols and illustrate three of the seven layers. FIG. 11 provides a diagram of the data flow of IP traffic based on an RFC1577 model.

In FIG. 8, the lowest layer in the OSI model represents the IEEE domain, for example, an Ethernet LAN domain. Also in this level is the media access control (MAC) for the cable data network which controls the timing of transmissions to the distribution hub and/or MHE. When a user's PC sends information over the LAN, the data is in variable length packets (IEEE format, e.g., up to 1500 bytes). The packets do not need to exist in this format. When they physically go over a different link, they may be structured as ATM cells of 53 bytes. There is a technique for taking the ATM packets and assembling them into variable length packets. This technique is known as an ATM adaptation layer (AAL). While there are several types of AALs, the preferred AAL for this application is AAL5 which is suited to "bursty" network communications which involve the use of substantial bandwidth for a short period and then no bandwidth for a longer period of time rather than continuous communication between network components.

The model of FIG. 8 also includes a quality of service (QOS) layer labeled Q.2931. Generally, QOS enables information to be passed more quickly through the network by demanding delivery of the data to its destination within a relatively short period of time.

Additional elements of the protocol stack of FIG. 8 include an Ethernet to ATM translation layer which takes data in variable length packets and converts them into ATM cells and a transparent bridge (TB) service which insures that only those transmissions which need to go beyond this modem actually go beyond the modem. The TB service sifts through the transmissions to determine which transmissions to send onto the network and which to keep within the LAN. This intelligence is different from a stand modem which transmits all information it receives from the user.

The functionality of the user modem is as follows. When data flow within the network from a first Ethernet station to a second Ethernet station, the network operates as a transparent bridge whereby two stations on different Ethernet segments exchange information via the ATM network.

If the source modem has already obtained the destination modem's E.164 address, the data packets are sent by the PC with SA (Source Address) and DA (Destination Address). The source modem receives the packets, as transparent bridge station, and forwards the packets (including the broadcasting packets) because the DA is different from the source PC'S. The ATM side of the modem then detains the packets and locates the associated ATM address for the destination address to setup an ATM connection to the destination modem (PC). The standard Q.2931 protocol is used via the pre-assigned VPI-0NVCI=5. The destination modem then reassembles ATM cells and re-creates Ethernet packet to forward to the destination PC across the Ethernet segment as shown in FIG. 9.

If the source modem does not have the destination modem's E.164 address, upon receiving the first packets with an unknown DA (ATM address is unknown), the modem setup a connection to the NCC to resolve the associate E.164 address. If NCC returns an E.164 address, the cable modem continues with the procedures described above with reference to FIG. 9. If NCC returns a null address, the modem may try again until the timer expires at the PC.

Data flow within the network architecture may also take place between two IP stations as illustrated in FIG. 10. An example of an IP connection over an ATM network is based on the model proposed in the RFC 1577 "Classical IP and ARP over ATM". With reference to FIG. 11, the RFC1577 model requires a ATMARP server(s) which provides the <ATM address, IP address>mapping within a Logical IP Subsystem. The inter-LIS communications are via an IP Router. The members in a LIS resolve the destination ATM address by sending request which contains the destination IP address to the ATMARP server. The ATMARP server builds its table by sending inARP (inverse ARP) to all the members in the LIS for their IP addresses.

If the IP router's ATM E.164 address is known by the source modem, the source modem requests an ATM connection using Q.2931 protocol following the procedures described above. The IP router then terminates ATM connection and reconstructs the IP packets. Appropriate routing decision can be made afterward.

If the IP router's ATM address is unknown, the ARP function located in the PC protocol stack transmits an Ethernet broadcast packet carrying the router's IP address (ATMARP). The cable modem forwards the broadcast packet to the NCC (ATMARP) since it is a broadcast packet. The NCC then returns the attached IP router's E.164 ATM address to the Cable Modem. Note that in order to reuse the networking software on the PC, the NCC may choose to return IEEE address of the IP to the modem so that the ARP can have an Ethernet address as the response of its ARP. From then on, the PC provides the IP's Ethernet address on the DA field of the packet it creates. The modem then requests an ATM connection to the IP router using the Q.2931 procedures when it receives the next packet with the known DA including the IP's Ethernet address.

Figure 12:
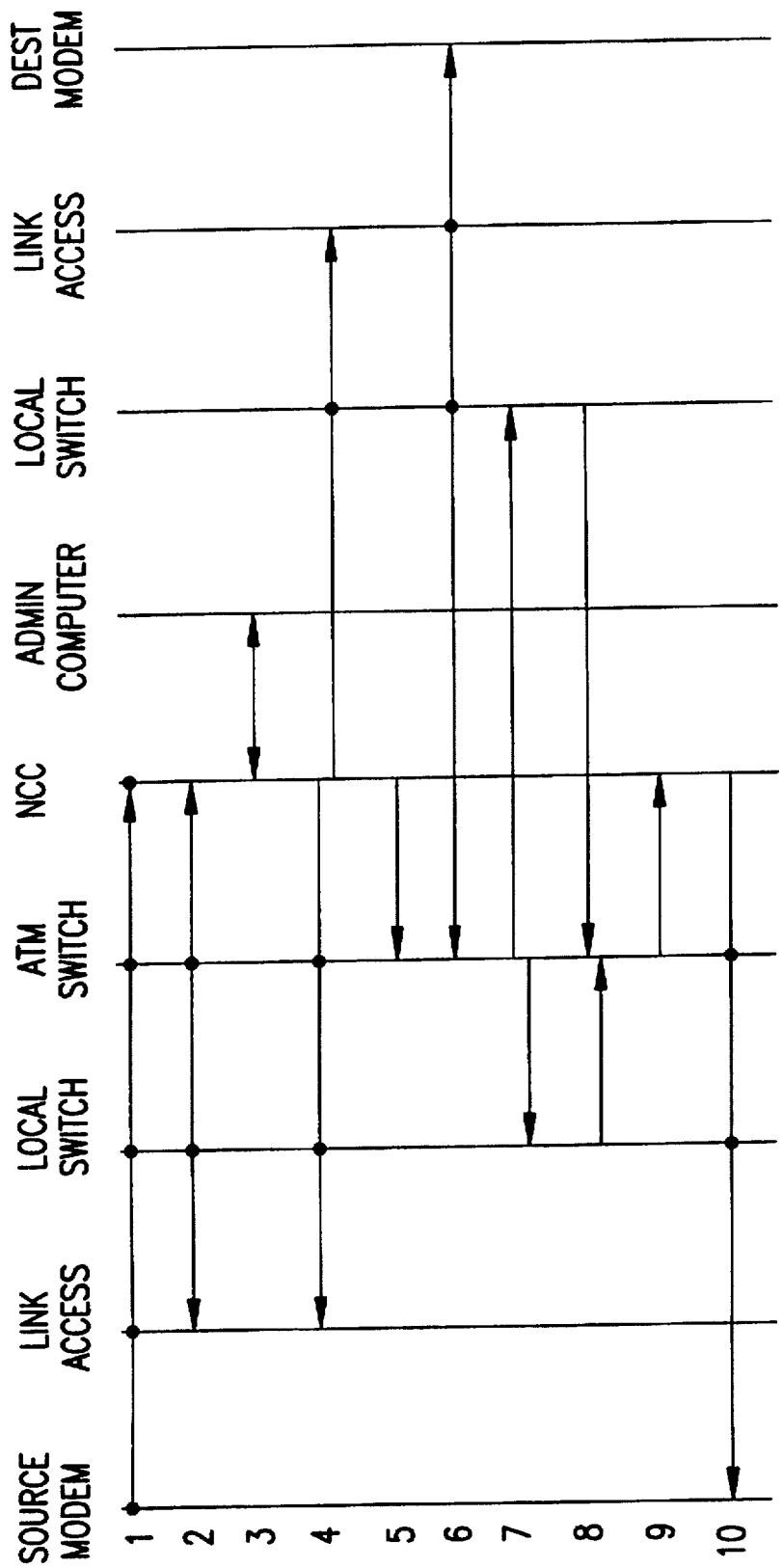
FIG. 12 provides a diagram illustrating a disconnect sequence in the cable data network according to the present invention.

With reference to FIG. 12, in the cable data network architecture according to the present invention, a network connection must eventually be disconnected so that network resources can be reclaimed. In a LAN environment, there is no explicit disconnect sequence that can be used to indicate that additional communications to that destination will no longer be required. For this reason the modem makes intelligent choices as to when to terminate a session.

Two events are likely to trigger the need to disconnect an existing connection. After some period of time a connection can be aged out based on a loadable timer. Since a new connection be established later if needed again, little is to be lost by dropping a non-performing connection. Another reason to disconnect a connection is that a new connection to a different destination was attempted but the connection request was denied because there was insufficient bandwidth available to support the new connection. In this event, the modem may wish to select the connection that has had the least amount of activity and drop that connection and then attempt to restart the failed connection.

The modem will attempt to terminate a connection when either an elapsed time has passed without activity or there was a request for additional bandwidth that could not be granted. The modem sends a Disconnect Request (via Q.2931) message to the NCC.

The NCC then retrieves statistics associated with this session from Link Access Control and passes the statistics to Administration Computer. The NCC also tells source and destination Link Access Control to disconnect the session and tells the ATM switch to Disconnect (via Q.2931) the session. The ATM switch tells the Destination Modem to disconnect the session and tells the local ATM switches to disconnect the session. The local ATM switches confirm that they have disconnected the session. Finally, the ATM switch confirms to the NCC that the connection has been disconnected, and the NCC confirms modems request to Disconnect.

Messaging between the NCC and the ATM Switch is performed such that the NCC receives Q.2931 messages usually destined to ATM connection control manger, the NCC informs the ATM switch to setup a connection with a calling party address other than the NCC, and the ATM switch signals the completion of the call-setup procedure.

In order to perform these functions, NCC is aware of the internal ATM switch architecture and protocol which is vendor dependent.

For messaging between the NCC and the Administration Computer, a communication channel is required if the NCC functions and administration functions are carried out by different computers. Messaging may be accomplished by connecting the applications on the NCC and the Administration computers by an ATM PVC or SVC. The applications on the NCC and the Administration computer may also communicate through the TCP/IP with or without ATM connections as the underlying transport mechanism.

This communication channel enables the NCC to utilize the database maintained by the administration computer for service authorization. Additionally, this channel enables the Administration computer to inform the NCC the results of the authorization screening. Also, the channel enables the NCC to provide the administration computer the user usage statistics for billing purposes.

Media Access Control

In the cable data network according to the present invention, users transmit information in the upstream channel toward the headend and receive information from the downstream channel. A number of different mechanisms are available to control access to the upstream link by multiple users simultaneously while preventing collisions within the network. These methods include distributed queuing random access protocol (DQRAP); variations of the SA VSAT access method; Code Division/Multiple Access (CDMA) techniques; Discrete Multi-tone (DMT) techniques; the IEEE 802.14 access method; or a slotted aloha technique.

Figures 13, 14:
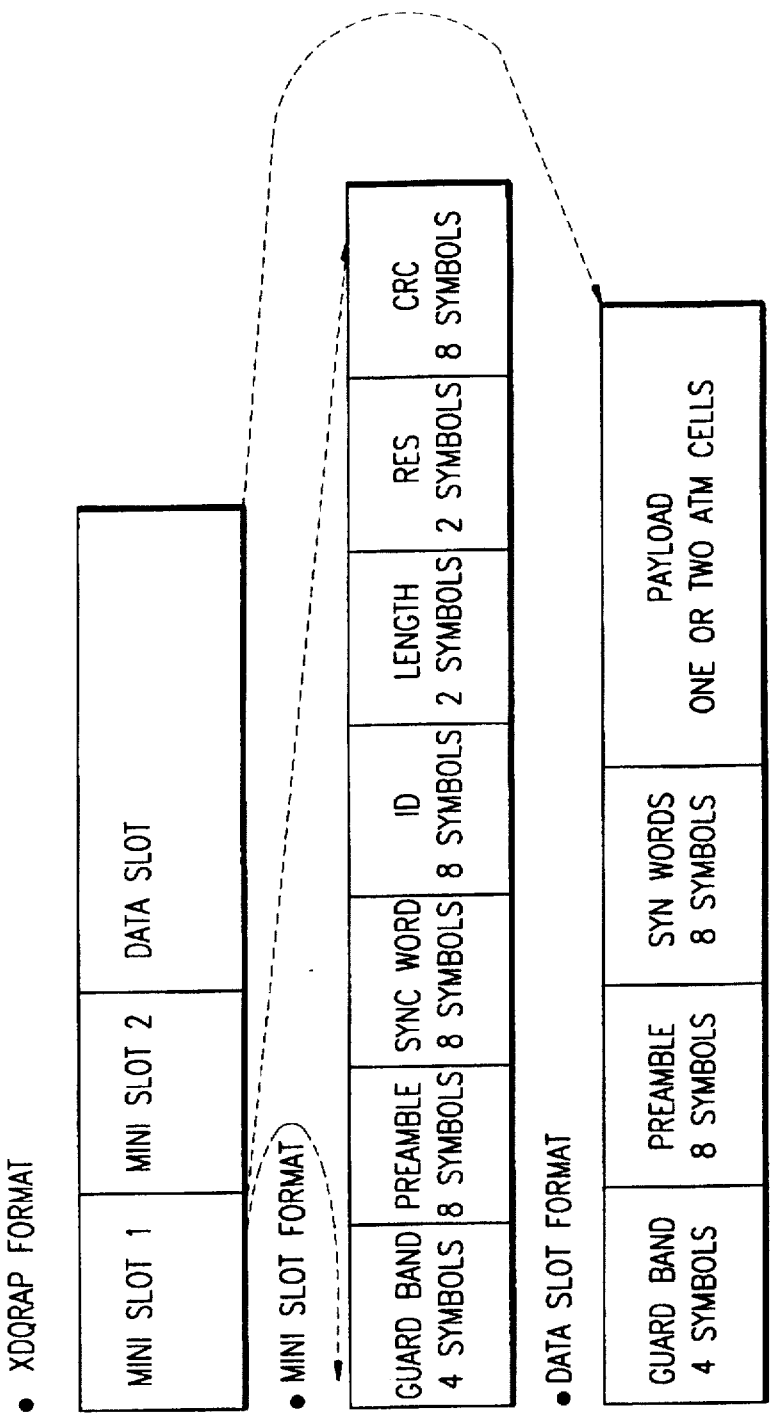
FIG. 13 provides a diagram of a MAC format for a reverse channel in a cable data network according to the present invention.
FIG. 14 provides a diagram a MAC format for a downstream channel in a cable data network according to the present invention.

FIGS. 13 and 14 provide an example of a MAC format or framing structure that may be used in the cable data network according to the present invention. However, the present invention is not limited to this MAC format, and other MAC formats may also be used in the cable data network architecture according to the present invention.

FIGS. 13 and 14 depict the framing structures in which data is put on and taken off of the data link between the user modem (see FIG. 3) and the distribution hub (see FIG. 2) of the cable data network. FIG. 13 illustrates the upstream MAC framing structure (from the user modem to the distribution hub), and FIG. 14 illustrates the downstream MAC framing structure (from the distribution hub to the user modem). The use of this framing structure enables sharing of the available bandwidth among numerous users. Additional details regarding this MAC format, known as extended DQRAP or XDQRAP are provided in U.S. Pat. No. 5,390,181, issued on Feb. 14, 1995 and "Extended DQRAP (XDQRAP): A Cable TV Protocol Functioning as a Distributed Switch," by G. Campbell and C. Wu, published by the Computer Science Department of the Illinois Institute of Technology in Chicago, Ill. and dated Jun. 24, 1994, both incorporated herein by reference.

In the upstream (reverse channel) framing structure of FIG. 13, two mini-slots are chosen instead of three because the overhead introduced by the mini-slots are not small in the cable environment. Each mini-slot is 10 bytes in length. The ID field contains the VPI/VCI values which identify the source of the request. The length field represents the number of cells for the request. The LAC can overwrite this field to satisfy the current traffic status. To reduce the overhead introduced by the mini-slots, the payload can be either one or two ATM cells.

In the downstream framing structure of FIG. 14, the Upstream Channel ID includes 4 bits. The Interleaving field includes 4 bits. The Mini slot 1 ACK field includes 27 bits: a 16 bit ID, a 3 bit feedback (e.g., 000=no information received; 001=one station ID received; 010=one station ID received—reject request because connection in excess of allotted bandwidth; 100=collision; 110=collision with at least one priority station involved), a 4-bit field indicating the number of data slots that can be sent, and a 4-bit reserved field. The second mini slot 2 ACK has the same format as the 1 ACK slot. The data feedback field includes 2 bits indicating whether data has been receive and whether the data is correct. The TQ feedback and RQ feedback fields include 7 bits respectively. The CRC field includes 8 bits.

Due to the long propagation delay and small data slot, the upstream channel falls into the "a. 0.5" category where "a" is the ratio of propagation delay to the frame transmission time. The interleaving factor is defined as "2a+1." To fully utilize the capacity, "2a+1" of parallel DQRAP engines are stet up at each station. Cells belonging to the same message must use the same engine to access the channel because the AAL5 layer which resides on top of the ATM layer does not have the ability to reassemble out-of-order cells which belong to the same AAL5 frame.

Access Determination

With reference to the MAC format (XDQRAP) shown in FIGS. 13 and 14 as described above, FIGS. 15A and 15B illustrate the access determination process for each user modem by which a user modem determines when to transmit to the distribution hub.

Figure 15A:
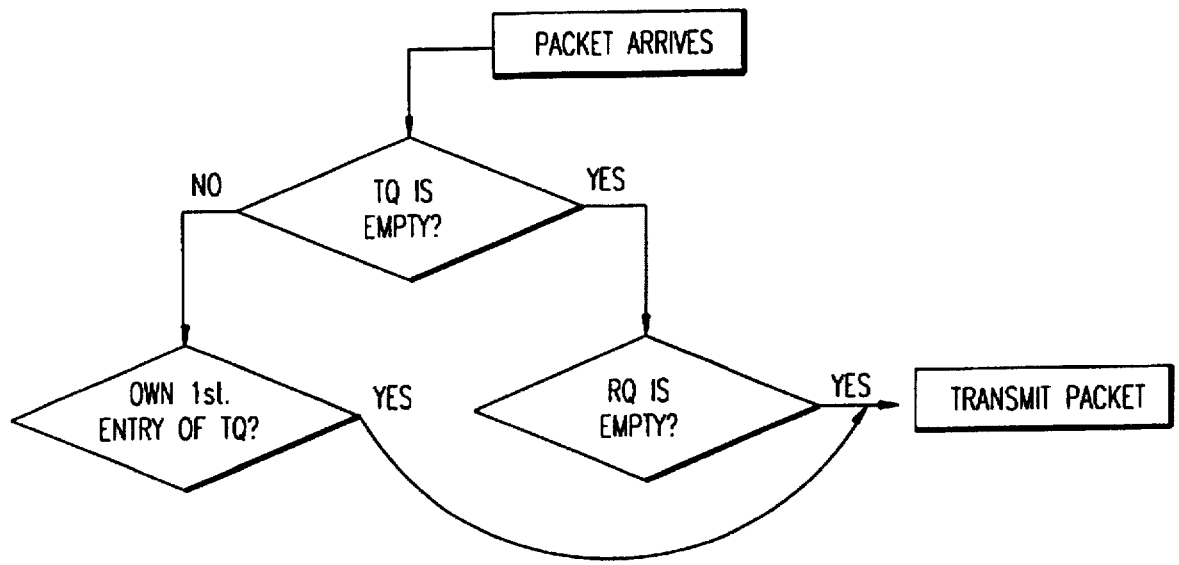
FIGS. 15A and 15B provide illustrations of a transmission access determination process for use in the cable data network according to the present invention.

As shown in FIG. 15A, when a packet arrives for transmission, the modem first determines whether the transmit queue (TQ) is empty. If so, the modem then determines whether the resolution queue (RQ) is empty. If so, the modem transmits the package over the network to the distribution hub. If the TQ is not empty, the modem determines whether the packet is the first entry in the TQ. If so, the modem transmits the package to the distribution hub.

Figure 15B:
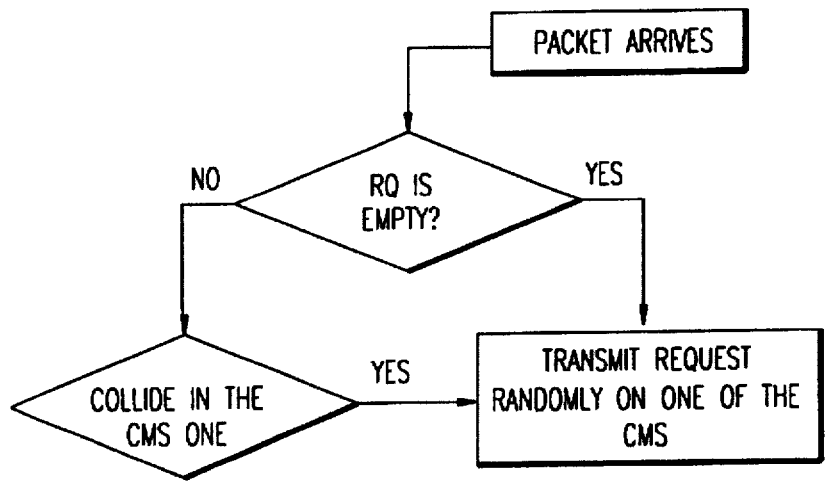

As shown in FIG. 15B, if the RQ is not empty, the packet has collided with another packet and the modem must determine which packet to transmit. The modem randomly selects one the control minislots (CMS) and then check that status to determine whether the packet has collided with another packet. If so, the modem once again randomly selects a CMS for transmission. If the packet collides with another packet on the second try, the modem lets the transmissions that collided the first time "fight" for priority. Additional information regarding priority determinations is provided in provisional U.S. Pat. application Ser. No._____, entitled "Centralized Queuing Random Access Protocol for CATV Network," and filed Oct. 20, 1995, and provisional U.S. patent application Ser. No. 60/005,747, entitled "Priority Preempt Mechanism in a Mini-Slot Control Contention-Based Medium Access Control," filed Oct. 20, 1995, both incorporated herein by reference.

Communication Layers

Figure 16:
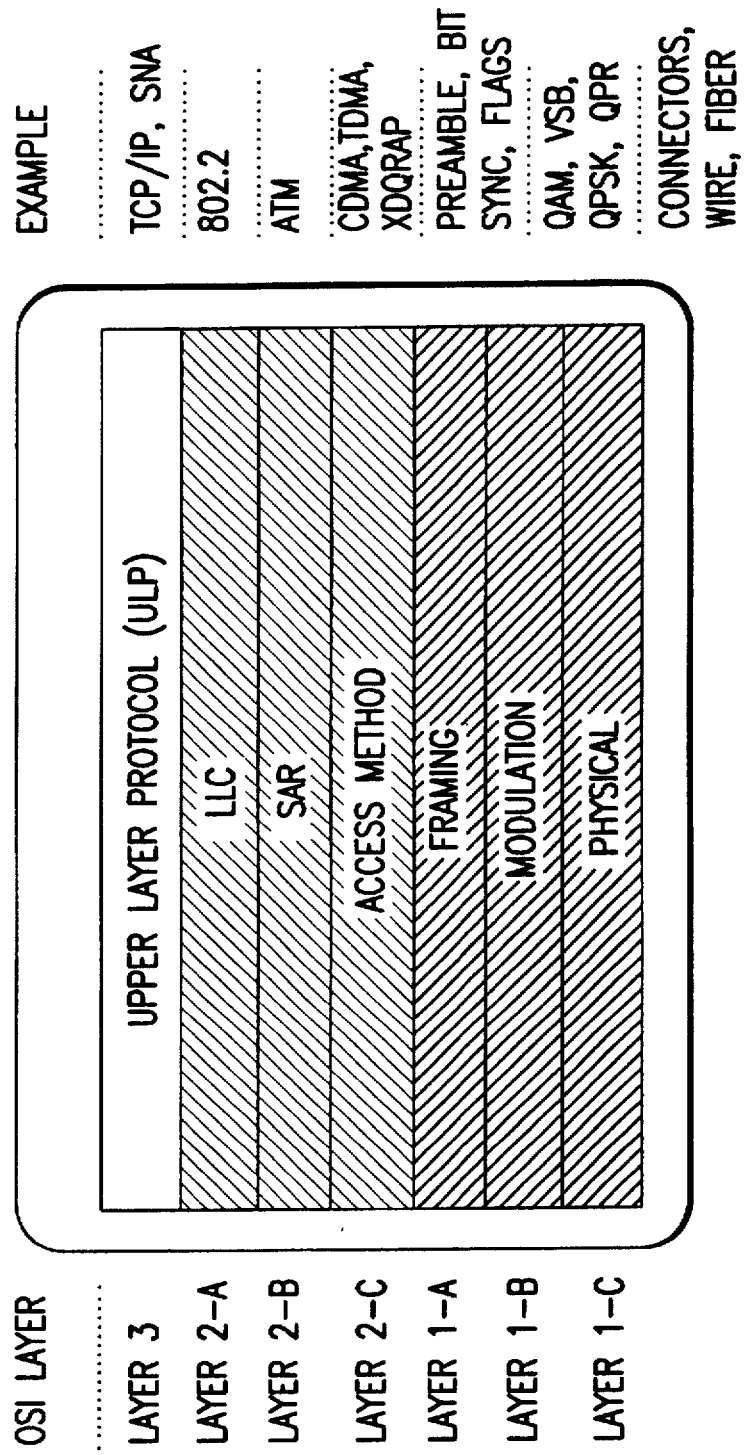
FIG. 16 provides a diagram of cable communication layers in a network according to the present invention.

FIG. 16 provides a diagram of cable communication layers in a network according to the present invention. The modem receives frames from the user's PC and remaps them to different transport protocols such as ATM protocol. The modem strips off the CS/MA and physical layers and implements from layer 2-C down for outgoing traffic. It performs the inverse function for incoming traffic.

Security (optional)

Figure 17:
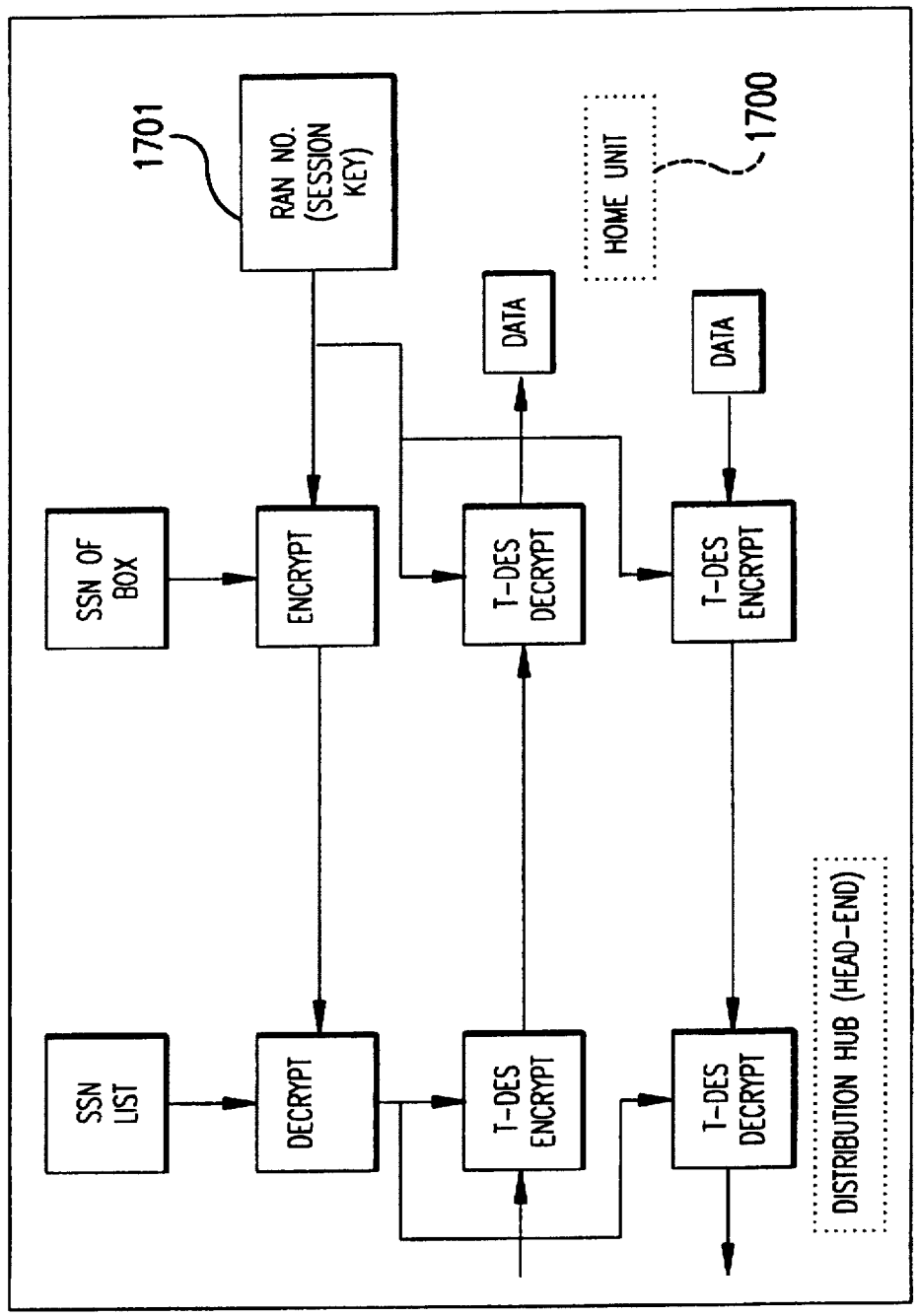
FIG. 17 provides a functional block diagram of optional security components within a cable data network according to the present invention.

With reference to FIG. 17, the modem may provide signal security in both directions of transmission. For example, a DES algorithm may be used for encryption and decryption of data in both directions of transmission.

A random generator 1701 at the home unit 1700 generates a random number that will serve as the session key. In this scheme, a triple-DES algorithm is shown. Triple-DES requires 112 bit keys and is significantly more difficult to break than the regular DES encryption. Triple-DES requires approximately 10 k-12 k gates for implementation. The DES algorithm significantly simplifies the key management process, as compared to the public key systems.

Other security methods may also be implemented in the network depending on the needs of the customers.

Broadband Network Management

FIG. 18 provides an example of a system in which the cable data network architecture according to the present invention may be integrated. The integrated system provides multiple services and functions. In this integrated system, network management functions of the cable data network fit into an overall system, cable modems will only be one of many types of network management required for an overall integrated system, this is only a unit of the larger integrated system. Shows how overall system architecture incorporates this cable modem architecture, or rather how the cable modem architecture fits into the overall integrated system.

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

What is claimed is:

1. A cable data network architecture, comprising:
   a master head-end comprising
      an inter-hub communications switch,
      a network controller,
      a network element manager, and
      one or more external communication links;
   a distribution hub coupled to said master head end via a first communication link, said distribution hub comprising
      at least one radio frequency modulators for modulating and transmitting data,
      at least one demodulator for receiving and demodulating return data,
      a link access control computer for controlling transmission and reception of data by said distribution hub,
      a hub element manager for detecting faulty communications to and from said distribution hub, and
      a local switch for switching data between said modulators, said demodulators, said link access computer and said hub element manager within said distribution hub; and
   at least one user modem connected to said distribution hub via a second communication link, said user modem comprising
      a tuner for determining a channel for receiving data from said distribution hub,
      a demodulator for demodulating said received data,
      an address recognition circuit for determining whether an address associated with said data corresponds to an address served by said user modem,
      a modulator for modulating transmission data to be transmitted by said user modem,
      a tuner for determining a transmission channel for transmitting said transmission data, and
      a timing and control circuit for determining when said user modem transmits said transmission data to said distribution hub over said second communication link.

2. A cable data network architecture according to claim 1, wherein said inter-hub communications switch in said master head end is an ATM switch.

3. A cable data network architecture according to claim 1, wherein said network controller in said master head end performs modem initialization, route computation, and directory service operations.

4. A cable data network architecture according to claim 1, wherein said network element manager in said master head end collects fault statistics from said hub element manager in said distribution hub via a direct external link.

5. A cable data network architecture according to claim 1, wherein said one or more external communication links in said master head end include an X.25 link, an ISDN link, an Internet link, or a Prodigy link.

6. A cable data network architecture according to claim 1, wherein said first communication link is a T3 or OC-3 communication link.

7. A cable data network architecture according to claim 1, further comprising an encryption/decryption device for encrypting data transmitted to said distribution hub via said first communication link and for decrypting information received from said distribution hub.

8. A cable data network according to claim 7, wherein said distribution hub further comprises an encryption/decryption device for encrypting data to be transmitted to said master head end via said first communication link and for decrypting encrypted data received from said master head end.

9. A cable data network architecture according to claim 1, wherein said master head end further comprises a router for determining the destination of received data based upon the contents of said received data.

10. A cable data network architecture according to claim 1, wherein said distribution hub further includes one or more encryption devices for individually encrypting transmissions to each said user modem based upon individual user encryption/decryption keys assigned by said network controller of said master head end and a decryption device for individually decrypting encrypted data received from each said user modem based upon said individual user encryption/decryption keys.

11. A cable data network according to claim 10, wherein each said user modem further comprises an encryption device for encrypting transmissions to said distribution hub based upon an individual user encryption/decryption key assigned by said network controller of said master head end and a decryption device for decrypting encrypted data received from said distribution hub based upon said user encryption/decryption key.

12. A cable data network architecture according to claim 1, wherein said distribution hub further includes one or more forward error correction circuits, each corresponding to an individual user modem, for preventing transmission errors between said distribution hub and said user modems.

13. A cable data network architecture according to claim 12, wherein each said user modem further comprises a forward error correction circuit for correcting transmission errors of data received from said distribution hub based upon information inserted into said received data by a respective forward error correction circuit in said distribution hub.

14. A cable data network architecture according to claim 1, wherein said link access control circuit in said distribution hub.

15. A cable data network architecture according to claim 1, wherein said link access control circuit in said distribution hub gathers usage statistics for each said user modem, limits usage by each said user modem, and provides status data regarding said second communication link to said modulators and said master head end.

16. A cable data network architecture according to claim 1, wherein said modulators in said distribution hub are 64 quadrature amplitude modulation (QAM) modulators operating at a rate of 27 MB/s.

17. A cable data network architecture according to claim 1, wherein said demodulators in said distribution hub are quadrature phase shifted key (QPSK) demodulators operating at a rate of 1.5 Mb/s.

18. A cable data network architecture according to claim 1, wherein the components within said distribution hub communicate via an Ethernet local area network.

19. A cable data network architecture according to claim 1, wherein data received by said distribution hub is provided to said local switch for subsequent transmission to said master head end or said user modems via an ATM link operating at a rate of 25 MB/s.

20. A cable data network architecture according to claim 1, wherein said user modem is coupled to a local area network to which one or more personal computers are connected, said user modem further comprising an interface for interfacing with said local area network and a processor for formatting data received from said distribution hub to be compatible with said local area network.

21. A cable data network architecture according to claim 20, wherein said processor converts ATM data packets into serial data for transmission onto an Ethernet local area network.

22. A cable data network architecture according to claim 1, wherein said timing and control circuit of said user modem performs media access control functions to control transmissions by said user modem to said distribution hub.

23. A cable data network architecture according to claim 22, wherein said media access control functions are achieved by use of an XDQRAP media access control format.

24. A cable data network architecture, comprising:

(a) a master head-end comprising
 an inter-hub communications switch,
 a network controller, and
 one or more external communication links;

(b) a distribution hub coupled to said master head end via a first communication link, said distribution hub comprising at least one radio frequency modulators for modulating and transmitting data, at least one demodulator for receiving and demodulating return data, a link access control computer for controlling transmission and reception of data by said distribution hub, a hub element manager for detecting faulty communications to and from said distribution hub, and a local switch for switching data between said modulators, said demodulators, said link access computer and said hub element manager within said distribution hub;

(c) a network element manager; and (d) at least one user modem connected to said distribution hub via a second communication link, said user modem comprising a tuner for determining a channel for receiving data from said distribution hub, a demodulator for demodulating said received data, an address recognition circuit for determining whether an address associated with said data corresponds to an address served by said user modem, a modulator for modulating transmission data to be transmitted by said user modem, a tuner for determining a transmission channel for transmitting said transmission data, and a timing and control circuit for determining when said user modem transmits said transmission data to said distribution hub over said second communication link.

* * * * *